(12) United States Patent
Bell

(10) Patent No.: US 11,928,196 B2
(45) Date of Patent: Mar. 12, 2024

(54) APPARATUSES FOR IMPROVED ELECTRONIC DATA STORAGE AND TRANSFER AND COMPUTER-IMPLEMENTED METHODS OF USING THE SAME

(71) Applicant: Tawaun Bell, Warner Robins, GA (US)

(72) Inventor: Tawaun Bell, Warner Robins, GA (US)

(73) Assignee: Tawaun Bell, Warner Robins, GA (US)

( * ) Notice: Subject to any disclaimer, the term of this patent is extended or adjusted under 35 U.S.C. 154(b) by 588 days.

(21) Appl. No.: 17/021,750

(22) Filed: Sep. 15, 2020

(65) Prior Publication Data
US 2022/0083635 A1    Mar. 17, 2022

(51) Int. Cl.
| | |
|---|---|
| G06F 21/32 | (2013.01) |
| G06F 3/0488 | (2022.01) |
| G06F 3/06 | (2006.01) |
| G06F 21/60 | (2013.01) |
| G06F 21/79 | (2013.01) |

(52) U.S. Cl.
CPC ............ *G06F 21/32* (2013.01); *G06F 3/0488* (2013.01); *G06F 3/0622* (2013.01); *G06F 3/0653* (2013.01); *G06F 3/067* (2013.01); *G06F 3/0679* (2013.01); *G06F 21/602* (2013.01); *G06F 21/79* (2013.01)

(58) Field of Classification Search
CPC ...... G06F 21/32; G06F 3/0488; G06F 3/0622; G06F 3/0653; G06F 3/067; G06F 3/0679; G06F 21/602; G06F 21/79; G06F 21/60
See application file for complete search history.

(56) References Cited

U.S. PATENT DOCUMENTS

| | | | |
|---|---|---|---|
| 8,604,906 B1 * | 12/2013 | Halferty | ................ H04W 12/30 340/5.83 |
| 9,665,286 B2 | 5/2017 | Koseki | |

(Continued)

OTHER PUBLICATIONS

Neagu, Send files from an Android smartphone to Windows 10, with Bluetooth, https://www.digitalcitizen.life/send-files-android-windows-10-bluetooth/ (Year: 2019).*

(Continued)

*Primary Examiner* — Robert B Leung
*Assistant Examiner* — Howard H. Louie
(74) *Attorney, Agent, or Firm* — Alston & Bird LLP

(57) ABSTRACT

Embodiments of the present disclosure provide for improved SSD implementations and methods of using the same. Example embodiments utilize any of a myriad of wireless networking mechanisms for enabling access to a solid state storage drive. Some example embodiments include security mechanisms, such as biometric security, software-based authentication, and/or the like, for ensuring accurate user authentication before providing access to the storage. Some example embodiments provide indicators regarding executing functionality to further improve overall device security. Some example embodiments include a touch-adaptive display that provides various renderings associated with accessing the storage, performing storage functionality, configuring one or more aspects of the embodiment, and/or otherwise operating the storage in a manner desired by the user.

11 Claims, 11 Drawing Sheets

(56) References Cited

U.S. PATENT DOCUMENTS

| | | | | |
|---|---|---|---|---|
| 2006/0094402 | A1* | 5/2006 | Kim | H04W 12/50 455/411 |
| 2008/0097911 | A1* | 4/2008 | Dicks | G16H 40/67 705/50 |
| 2009/0089588 | A1* | 4/2009 | Adrangi | G06F 21/32 726/19 |
| 2012/0166810 | A1* | 6/2012 | Tao | G06F 21/32 713/186 |
| 2013/0086284 | A1* | 4/2013 | Shaver | G06F 1/3287 710/18 |
| 2014/0065948 | A1* | 3/2014 | Huang | H04W 4/80 361/679.01 |
| 2014/0229374 | A1* | 8/2014 | James | G06Q 20/108 705/42 |
| 2014/0237171 | A1 | 8/2014 | Sutardja et al. | |
| 2014/0244078 | A1* | 8/2014 | Downey | G05D 1/0094 29/832 |
| 2015/0264047 | A1* | 9/2015 | Roy | H04W 12/06 726/4 |
| 2015/0378886 | A1 | 12/2015 | Nemazie et al. | |
| 2016/0065571 | A1* | 3/2016 | Hoyos | H04L 63/0428 713/168 |
| 2022/0308724 | A1* | 9/2022 | Ye | H04N 21/43615 |

OTHER PUBLICATIONS

Alibaba.com. "ESP-WROOM-32 ESP32 ESP-32 and WIFI Dual Core CPU With Low Power Consumption," (4 pages). [online]. [Retrieved from the Internet Sep. 22, 2020] <URL: https://www.alibaba.com/product-detail/ESP32-ESP-WROOM-32-IoT-Wifi_60677185408.html?spm=a2700.details.maylikehoz.1.74a13158kV4mq6>.

Alibaba.com. "Advantage Supply 3mm Thickness 3.7v Lipo Battery Ultra Thin 20000mah Portable External Battery," (11 pages). [online]. [Retrieved from the Internet Sep. 22, 2020] <URL: https://www.alibaba.com/product-detail/Advantage-supply-3mm-thickness-3-7v_60789410105.html?spm=a2700.wholesale.deiletai6.11.454024a6efxTAt&bypass=true>.

Alibaba.com. "5.0 inch 480*854, MCU Interface, Wide Viewing Angle IPS LCD With Capacitive Touch Screen Stock For Sale," (11 pages). [online]. [Retrieved from the Internet Sep. 22, 2020] <URL: https://www.alibaba.com/product-detail/5-0-inch-480-854-MCU_62262506784.html?spm=a2700.7735675.normalList.1.749c51b7kYOLgc&bypass=true>.

Alibaba.com. "Professional Factory High Gain NFC Antenna For Mobile Phone," (9 pages). [online]. [Retrieved from the Internet Sep. 22, 2020] <URL: https://www.alibaba.com/product-detail/Professional-Factory-High-Gain-NFC-Antenna_62416495614.html?spm=a2700.galleryofferlist.0.0.22382bfatn86PA>.

ElecHouse. "PN532 NFC RFID Module w/ External Antenna," (4 pages). [online]. [Retrieved from the Internet Sep. 22, 2020] URL: https://www.elechouse.com/elechouse/index.php?main_page=product_info&cPath=&products_id=2269>.

Midas Touch. "MFC-2160Q 160*160 Round Capacitive Fingerprint Sensor with IP67," (5 pages). [online]. [Retrieved from the Internet Sep. 22, 2020] <URL: https://www.midastouchinc.com/product/round-capacitive-fingerprint-sensor-with-ip67/>.

* cited by examiner

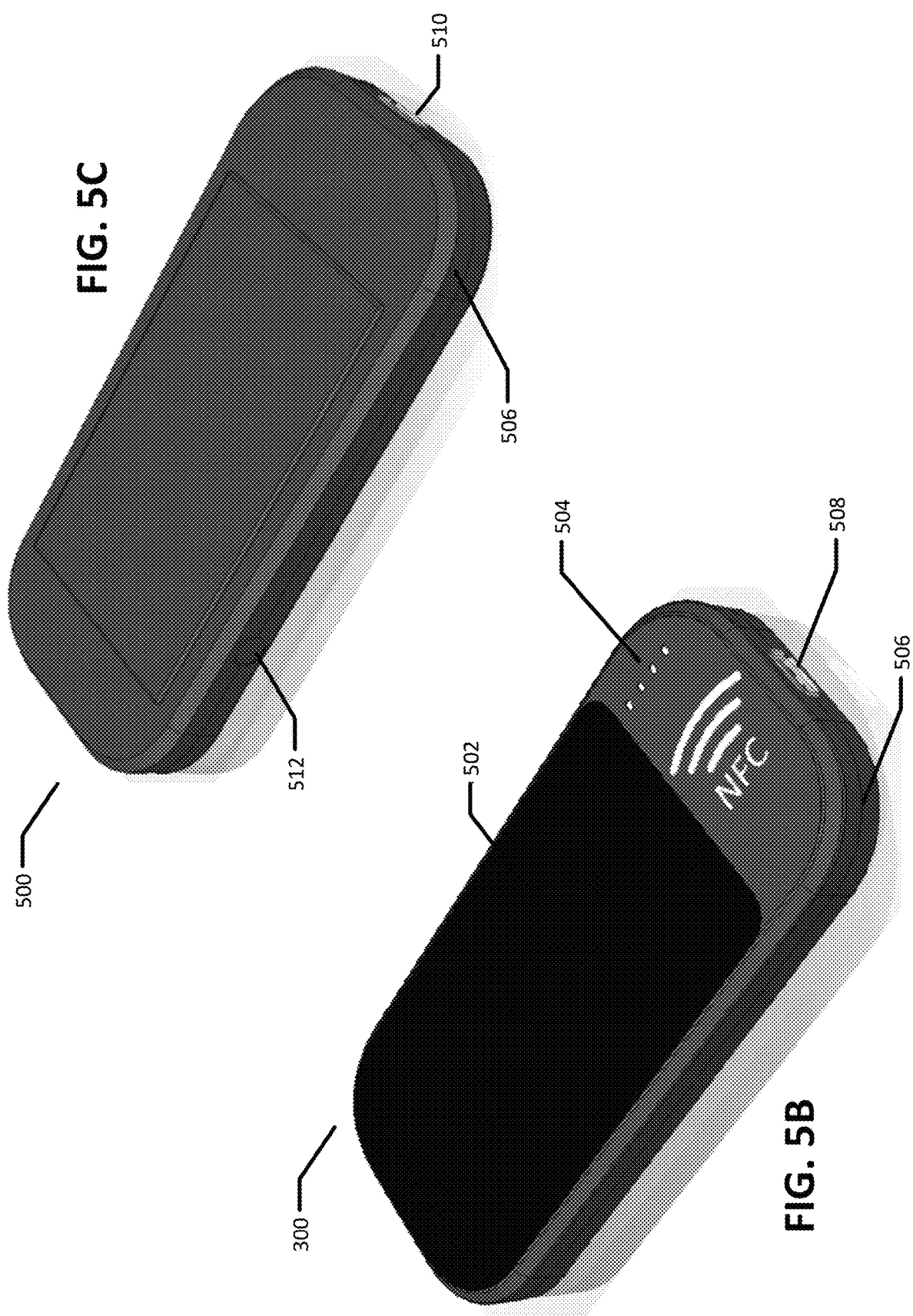

APPARATUSES FOR IMPROVED
ELECTRONIC DATA STORAGE AND
TRANSFER AND
COMPUTER-IMPLEMENTED METHODS OF
USING THE SAME

TECHNOLOGICAL FIELD

Embodiments of the present disclosure generally relate to electronic data storage devices, and specifically to improvements in solid state storage drives and related functionality.

BACKGROUND

Conventionally, data storage devices are configured to readily connect with another device, such as a personal computer or laptop, to quickly enable use of such data storage devices with these other computing devices. In the context of mobile data storage devices (e.g., portable solid state drives or "portable SSDs"), a mobile data storage device is constantly moved around, such as wherever the user goes, such that maintaining relative usability and quick access to the mobile data storage device is important for user adoption and to ensure a positive user experience. Conventional implementations, however, often provide such easy usability at the expense of sufficient data security measures to ensure that access to the mobile data storage device is only granted to those that should have access. Applicant has discovered problems with current implementations of mobile data storage devices. Through applied effort, ingenuity, and innovation, Applicant has solved many of these identified problems by developing embodied in the present disclosure, which are described in detail below.

BRIEF SUMMARY

In general, embodiments of the present disclosure provided herein provide improved data storage devices and methods of using the same. Other implementations for improved data storage devices and methods of using the same will be, or will become, apparent to one with skill in the art upon examination of the following figures and detailed description. It is intended that all such additional implementations be included within this description be within the scope of the disclosure, and be protected by the following claims.

In accordance with one aspect of the present disclosure, a specially configured apparatus is provided. In one example implementation, the example apparatus includes a touch-adaptive display configured to receive user input and render data. The example apparatus further includes a solid state storage drive configured to store a set of electronically managed data objects. The example apparatus further includes a plurality of wireless networking processors associated with a plurality of wireless networking protocols. The example apparatus further includes at least one biometric scanner. The example apparatus further includes at least one device processor. The example apparatus further includes an assembled printed circuit board communicatively coupling each of the touch-adaptive display, the solid state storage drive, the plurality of wireless networking processors, the biometric scanner, and the at least one device processor, where the device processor is configured to authenticate that a user is permitted to access the solid state storage drive; identify the set of electronically managed data objects stored via the solid state storage drive; and transfer at least one of the set of electronically managed data objects to a communicable device via at least one of the plurality of networking processors.

Additionally or alternatively, in some example embodiments of the example apparatus, the device processor is further configured to establish a connection with the communicable device associated with the at least one of the plurality of networking processors.

Additionally or alternatively, in some example embodiments of the example apparatus, the apparatus further comprises a light indicator array, and the device processor is further configured to detect attempted access of the solid state storage drive by an unauthenticated communicable device; and in response to the detected attempted access of the solid state storage drive by the unauthenticated communicable device, setting the light indicator array to a first state indicating the attempted access of the solid state storage drive by the unauthenticated communicable device.

Additionally or alternatively, in some example embodiments of the example apparatus, the device processor is further configured to authenticate the unauthenticated communicable device; and in response to authenticating the unauthenticated communicable device, set the light indicator array to a second state.

Additionally or alternatively, in some example embodiments of the example apparatus, the device processor is further configured to detect termination of the attempted access of the solid state storage drive by the unauthenticated communicable device; and in response to detecting the termination of the attempted access of the solid state storage drive by the unauthenticated communicable device, set the light indicator array to a second state.

Additionally or alternatively, in some example embodiments of the example apparatus, the device processor is further configured to receive, from the communicable device or a second communicable device, one or more new electronically managed data objects for storage; and store, via the solid state storage drive, the one or more new electronically managed data objects.

Additionally or alternatively, in some example embodiments of the example apparatus, the apparatus further comprises at least one charging port coupled with a battery configured to provide power to the apparatus; and at least one data transfer port, and the charging port and at least a first data transfer port of the at least one data transfer port are embodied by an integrated data-charging port.

Additionally or alternatively, in some example embodiments of the example apparatus, the at least one data transfer port comprises the integrated data-charging port of a first data transfer port type and a second data transfer port of a second data transfer port type.

Additionally or alternatively, in some example embodiments of the example apparatus, the device processor is further configured to receive, via user input data, a selected wireless networking processor of the plurality of wireless networking processors, and the device processor is configured to transfer the at least one of the set of electronically managed data objects to the communicable device via the selected wireless networking processor of the plurality of wireless networking processors Additionally or alternatively, in some example embodiments of the example apparatus, the device processor is further configured to receive biometric data associated with the user in response to user interaction with the at least one biometric scanner, and where to authenticate the user is permitted to access the solid state storage drive, the device processor is configured to authenticate the user associated with biometric data is permitted to access the solid state storage drive.

Additionally or alternatively, in some example embodiments of the example apparatus, the device processor is further configured to cause rendering, via the touch-adaptive display, one or more representations associated with at least a portion of the set of electronically managed data objects.

Additionally or alternatively, in some example embodiments of the example apparatus, the device processor is configured to transfer the at least one of the set of electronically managed data objects in response to user interaction associated with at least one of the one or more representations associated with the at least a portion of the set of electronically managed data objects rendered via the touch-adaptive display.

Additionally or alternatively, in some example embodiments of the example apparatus, the device processor is further configured to in response to a predefined user interaction associated with the touch-adaptive display and associated with a first electronically managed data object, cause rendering, via the touch-adaptive display, of a preview interface associated with content data of the first electronically managed data object.

Additionally or alternatively, in some example embodiments of the example apparatus, the device processor is further configured to receive a file decryption value associated with at least the first electronically managed data object; and decrypt the first electronically managed data object to identify the content data of the first electronically managed data object.

Additionally or alternatively, in some example embodiments of the example apparatus, the at least one biometric scanner comprises a fingerprint scanner disposed perpendicular to the touch-adaptive display.

Additionally or alternatively, in some example embodiments of the example apparatus, the at least one biometric scanner comprises a second fingerprint scanner disposed with a shared orientation as the touch-adaptive display.

Additionally or alternatively, in some example embodiments of the example apparatus, the apparatus further comprises light indicator array communicatively coupled with the assembled printed circuit board.

Additionally or alternatively, in some example embodiments of the example apparatus, the apparatus further comprises a battery for powering the apparatus, and wherein the device processor is further configured to activate the light indicator array based on a charging level associated with the battery.

Additionally or alternatively, in some example embodiments of the example apparatus, the device processors further configured to set the light indicator array to a first state upon initiating of the transfer of the at least one of the set of electronically managed data objects; and set the light indicator array to a second state upon completion of the transfer of the at least one of the set of electronically managed data objects.

In accordance with yet another aspect of the present disclosure, an example computer-implemented method is provided. The computer-implemented method is executable via any of a myriad of computing devices in hardware, software, and/or firmware described herein. In one example embodiment, the example computer-implemented method is performable via a specially configured apparatus as described herein. In some embodiments, the computer-implemented method includes authenticating, by a device processor communicatively coupled via an assembled printed circuit board with a touch-adaptive display, a solid state storage drive, a plurality of wireless networking processors, a biometric scanner, and a data transfer port, a user is permitted to access the solid state storage drive. The example computer-implemented method further includes identifying, by the device processor, a set of electronically managed data objects stored via the solid state storage drive. The example computer-implemented method further includes transferring, by the device processor, at least one of the set of electronically managed data objects to a communicable device via at least one of the plurality of networking processors.

In accordance with yet another aspect of the present disclosure, an example computer program product is provided. The computer program product includes one non-transitory computer-readable storage medium having computer program code stored thereon. The computer program code is configured, in execution with at least one processor, to configure the at least one processor to perform any of the computer-implemented methods described herein.

BRIEF DESCRIPTION OF THE DRAWINGS

Figure 1A:
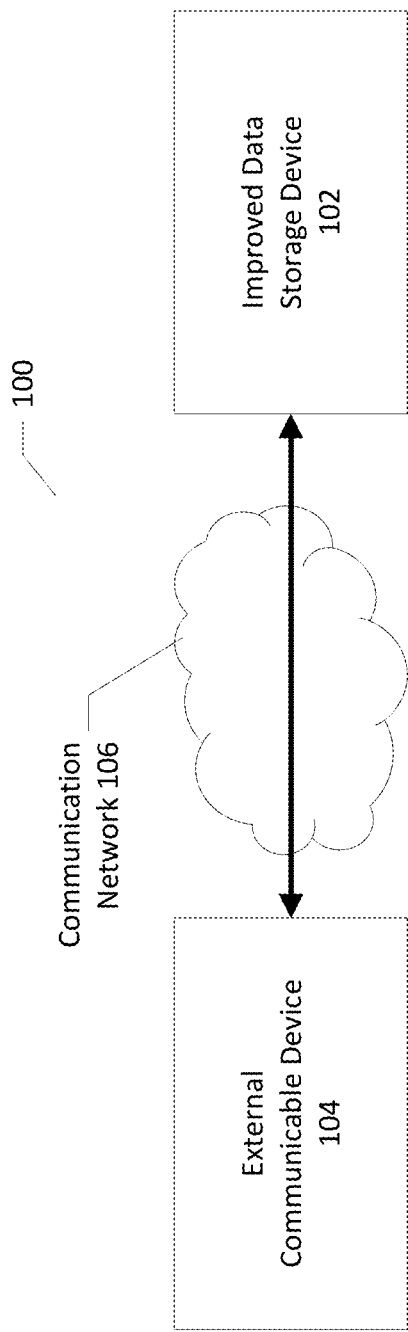
Figure 1B:
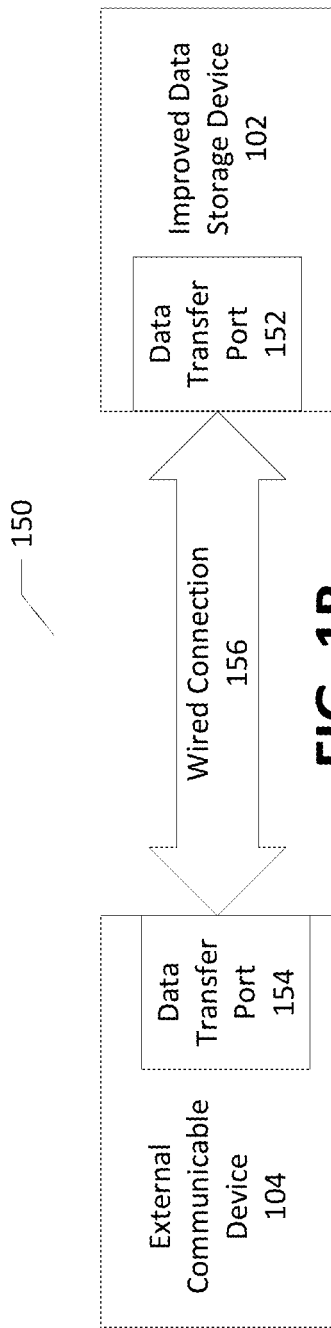
Figure 2:
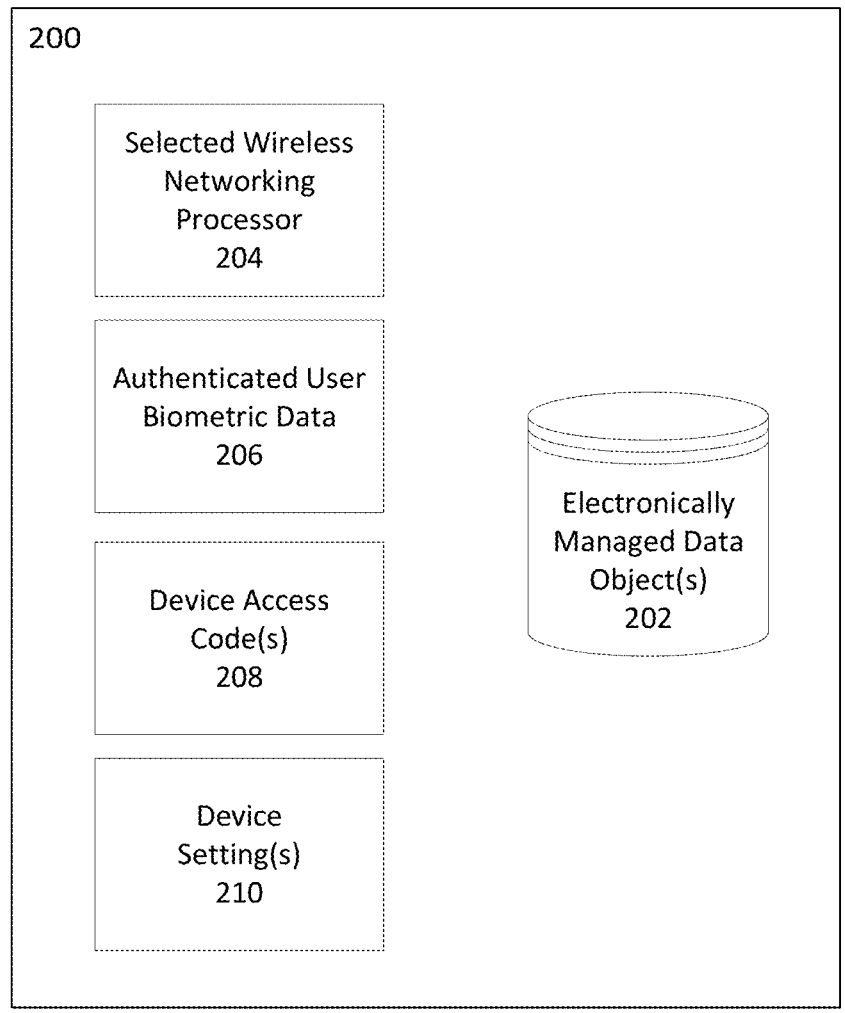
Figure 3:
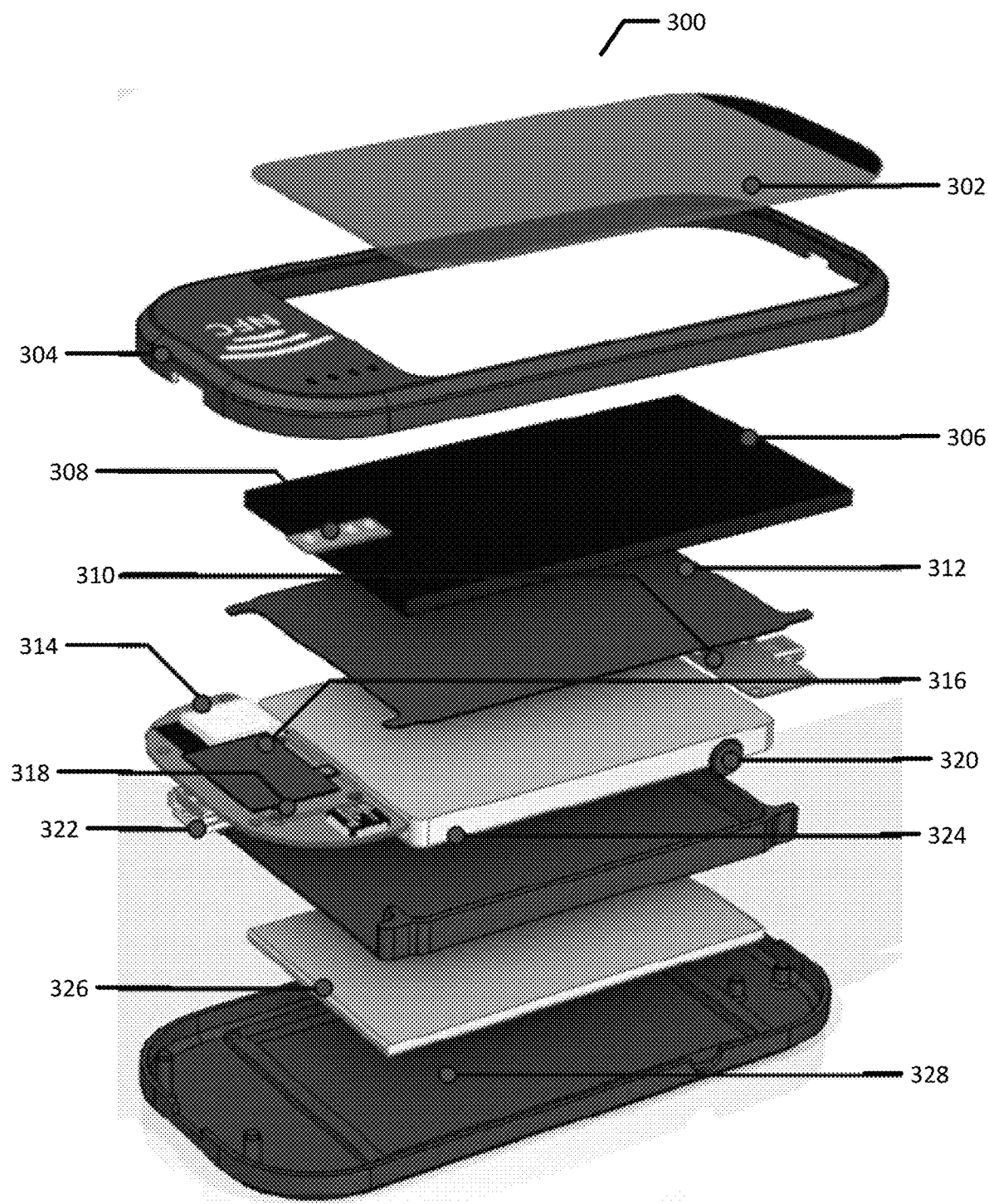
Figure 4:
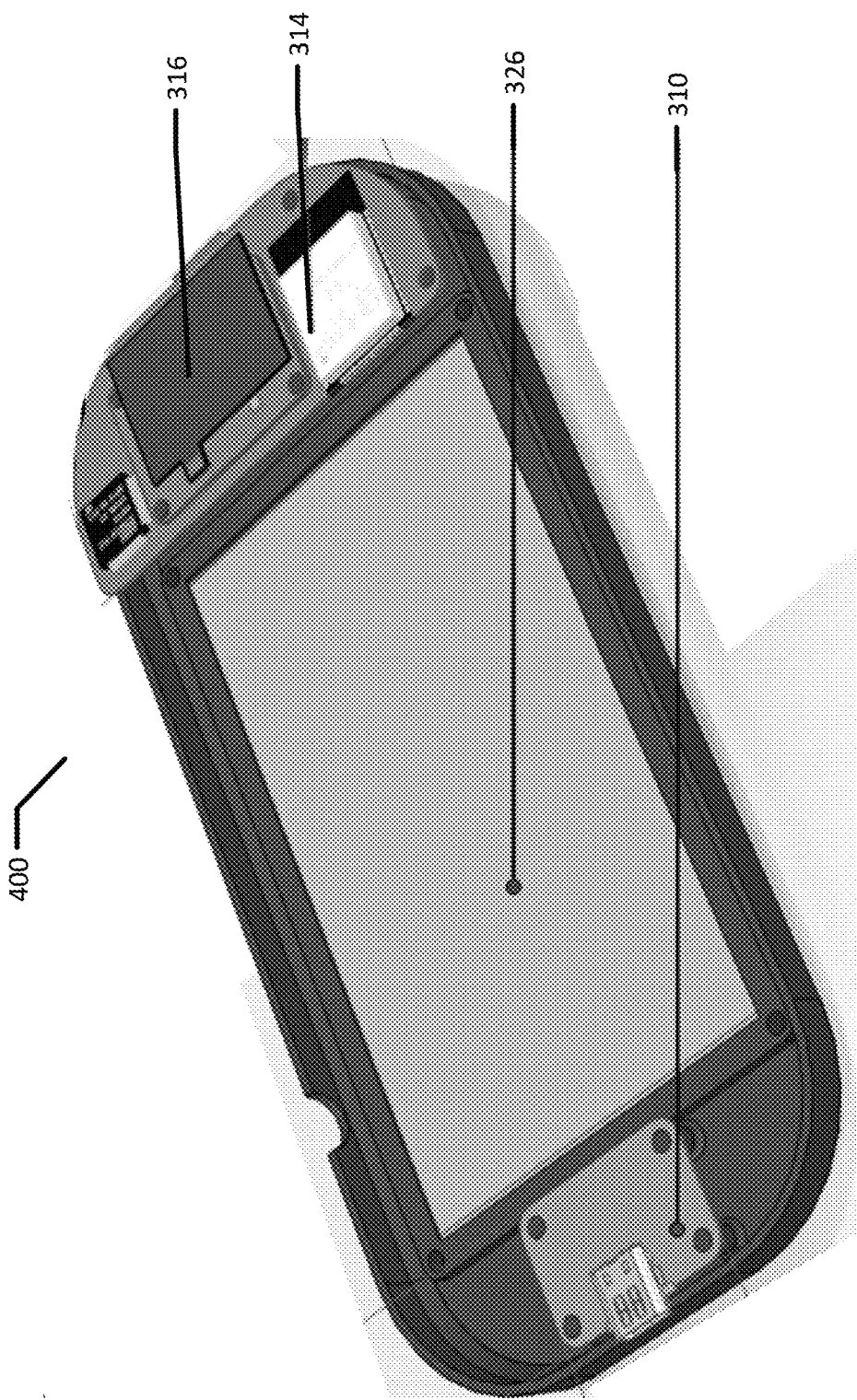
Figure 5A:
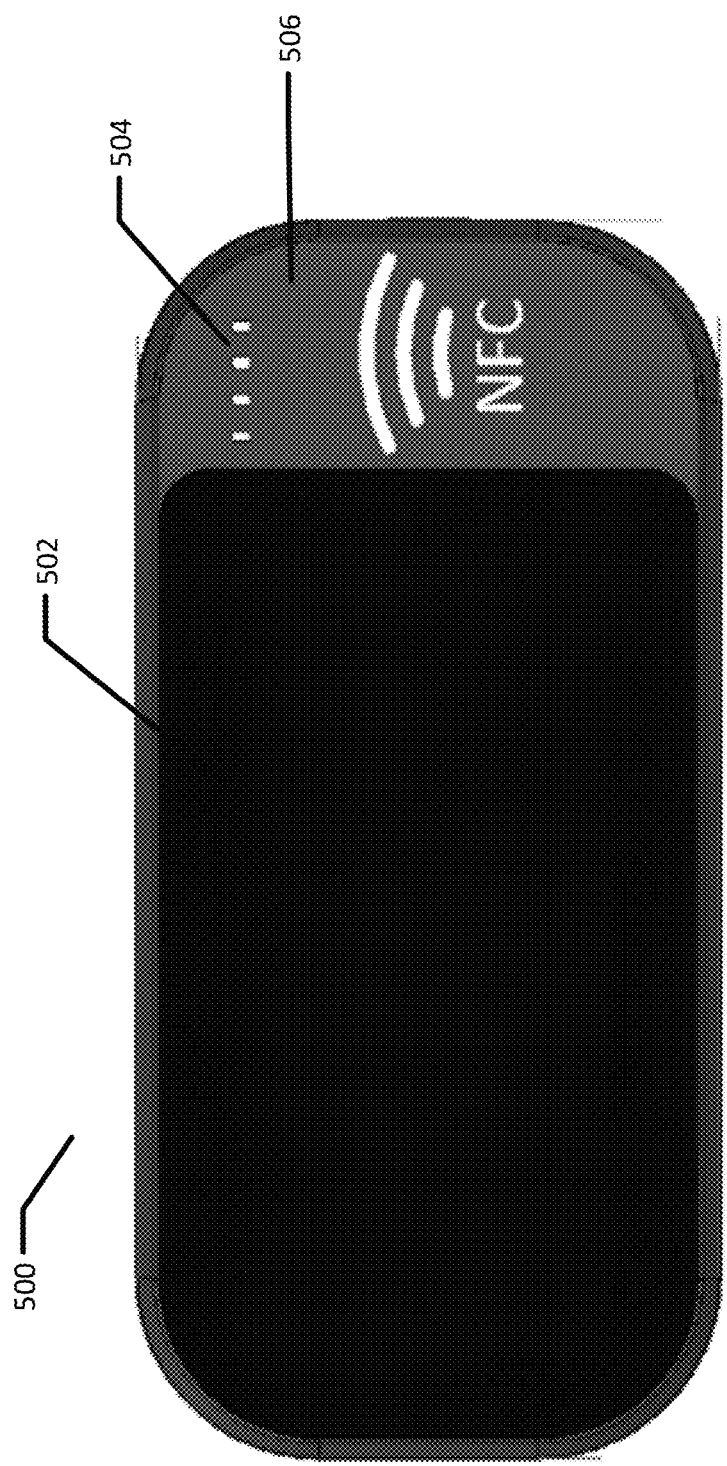
Figure 6:
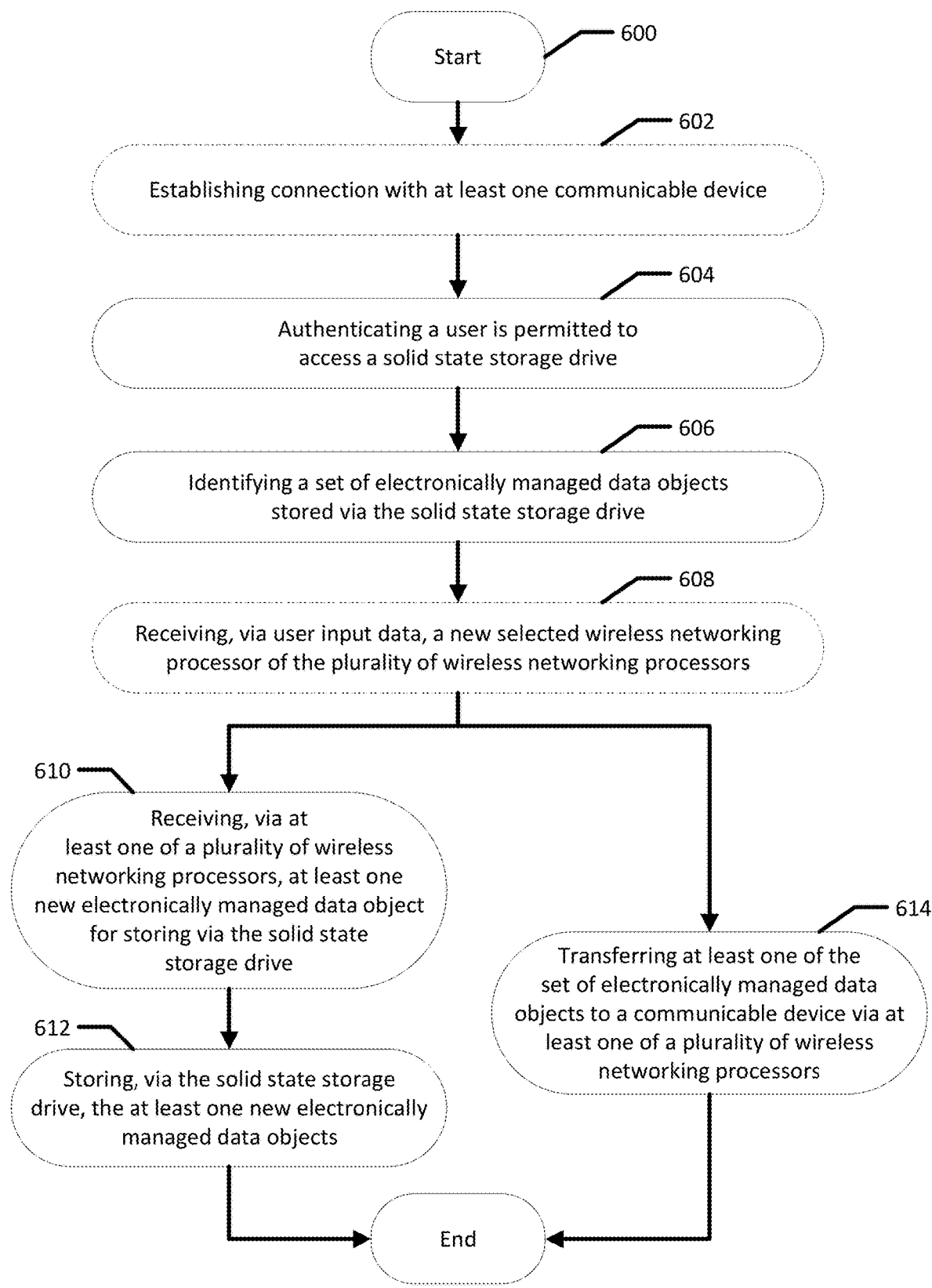
Figure 7:
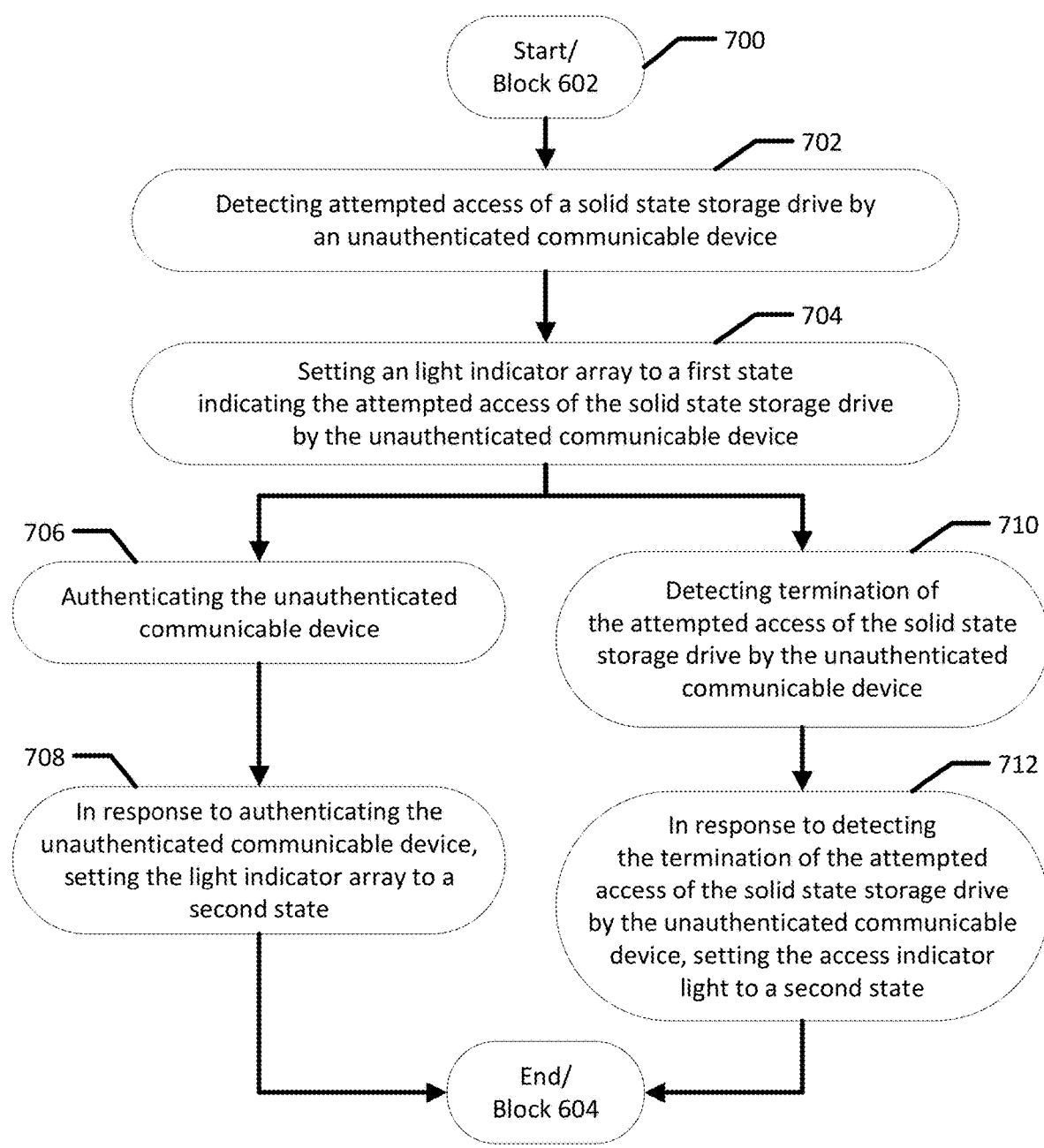
Figure 8:
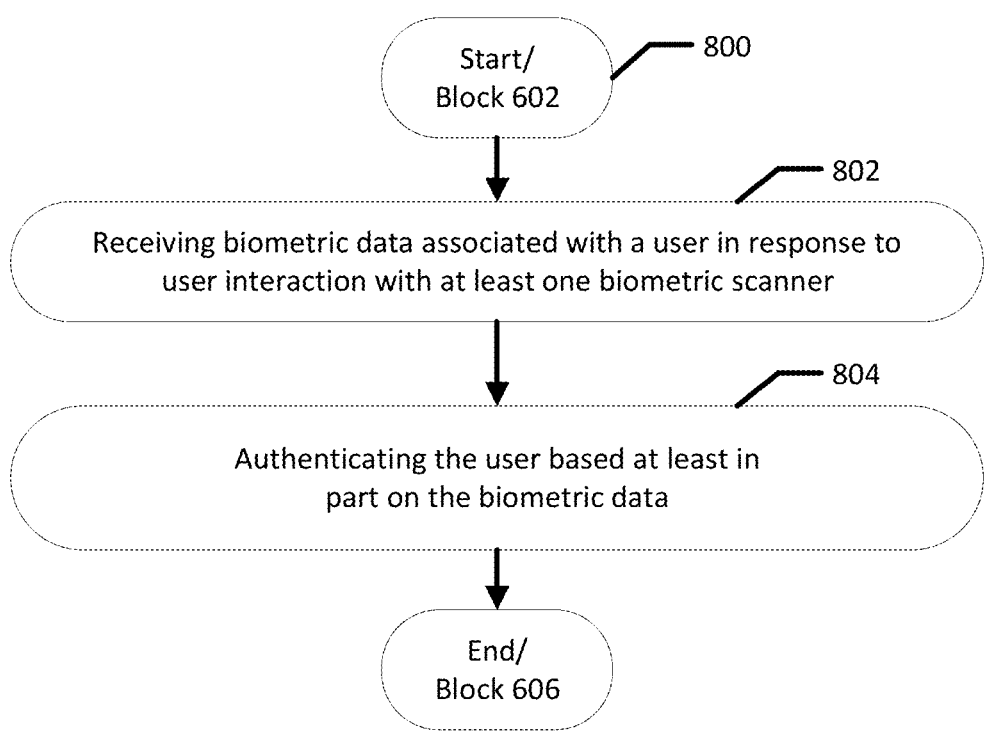
Figure 9:
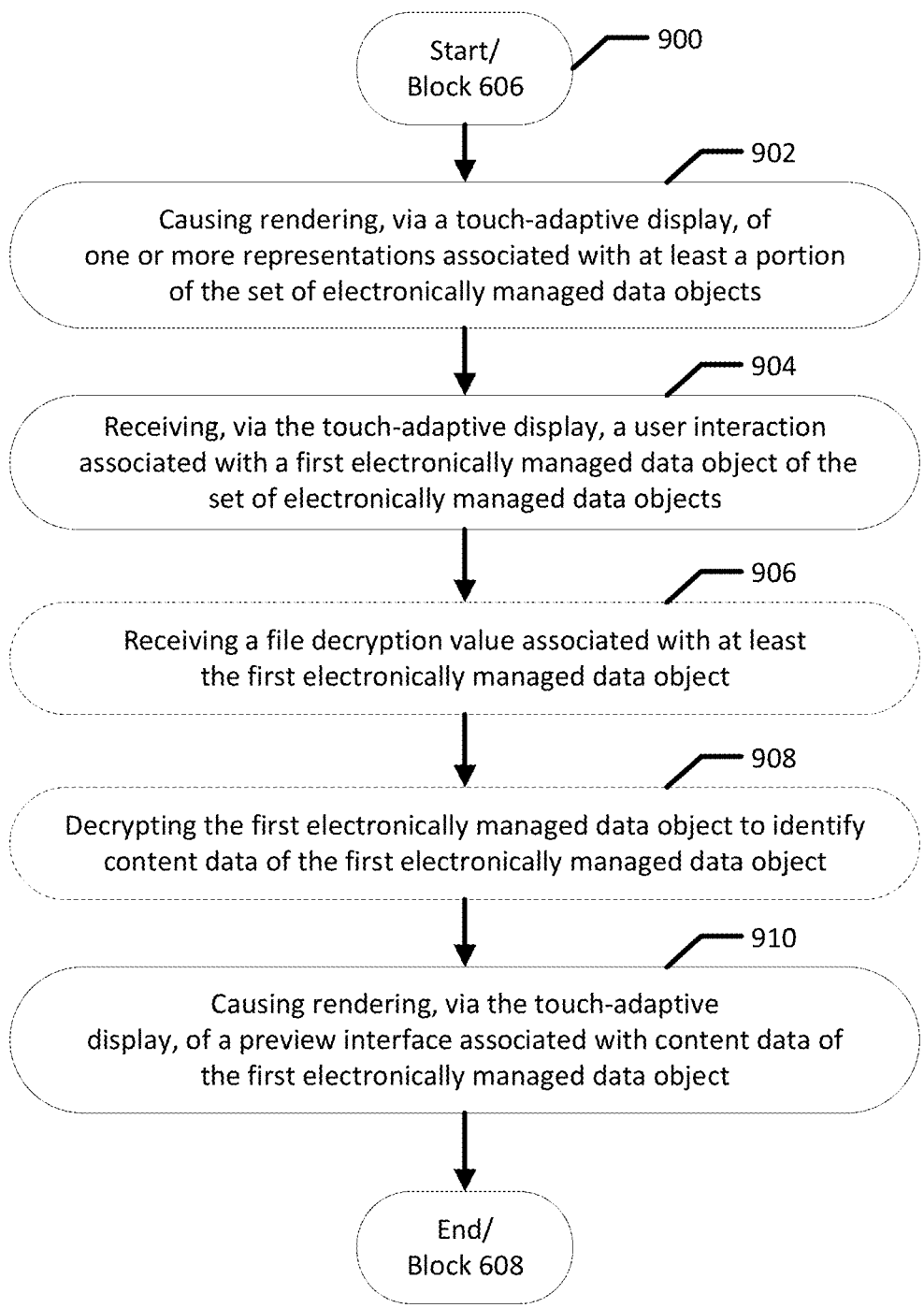
Figure 10:
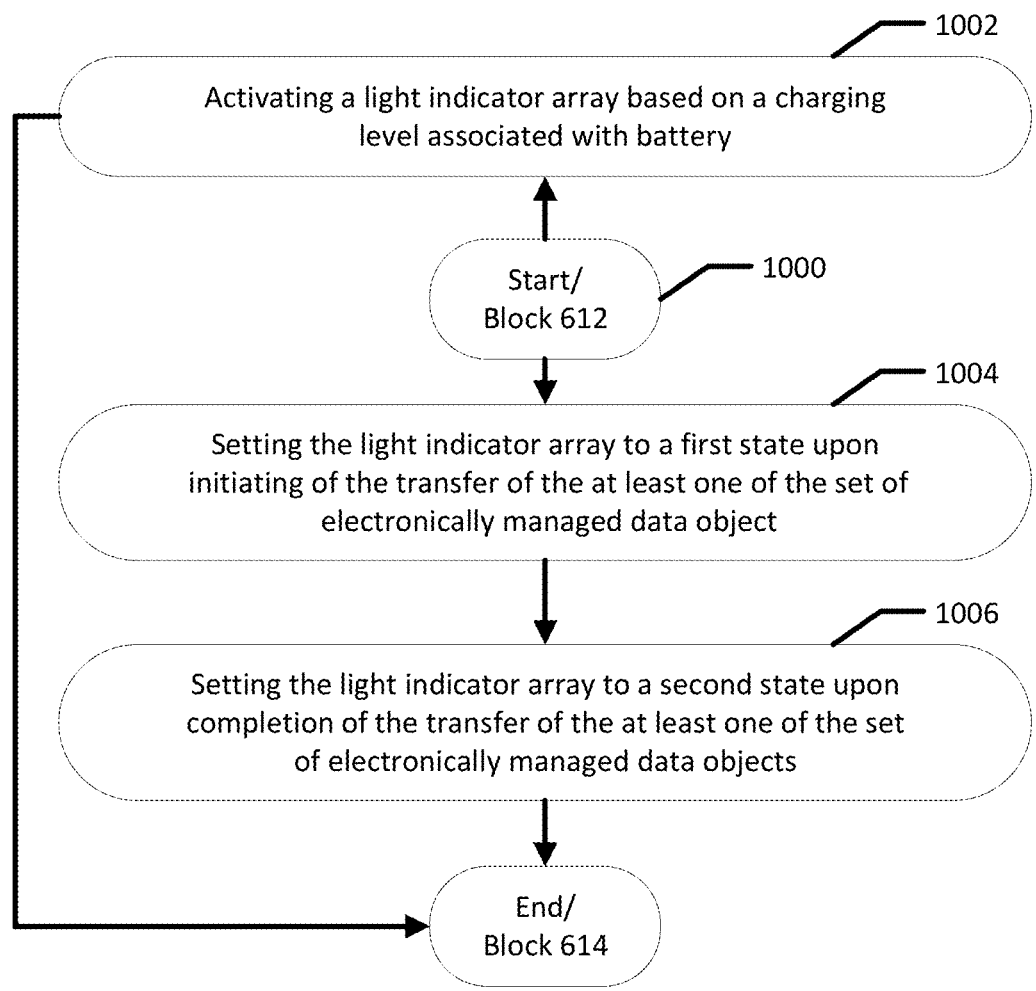

Having thus described the embodiments of the disclosure in general terms, reference now will be made to the accompanying drawings, which are not necessarily drawn to scale, and wherein:

FIG. 1A illustrates a block diagram of a system that may be specially configured within which embodiments of the present disclosure may operate;

FIG. 1B illustrates a block diagram of another system that may be specially configured within which embodiments of the present disclosure may operate;

FIG. 2 illustrates a visualization of a computing environment in accordance with at least one embodiment of the present disclosure;

FIG. 3 illustrates an example exploded view of an example improved data storage device in accordance with at least one embodiment of the present disclosure;

FIG. 4 illustrates an example collapsed internal view of an assembled example improved data storage device in accordance with at least one embodiment of the present disclosure;

FIG. 5A illustrates a front view of an example improved data storage device in accordance with at least one embodiment of the present disclosure;

FIG. 5B illustrates a perspective view of the front of an example improved data storage device in accordance with at least one embodiment of the present disclosure;

FIG. 5C illustrates a perspective view of the back of an example improved data storage device in accordance with at least one embodiment of the present disclosure;

FIG. 6 illustrates a flowchart including example operations of a process for operation of an improved data storage device in accordance with at least one embodiment of the present disclosure;

FIG. 7 illustrates a flowchart including additional example operations of a process for operation of an improved data storage device in accordance with at least one embodiment of the present disclosure;

FIG. 8 illustrates a flowchart including additional example operations of a process for operation of an improved data storage device in accordance with at least one embodiment of the present disclosure;

FIG. 9 illustrates a flowchart including additional example operations of a process for operation of an improved data storage device in accordance with at least one embodiment of the present disclosure; and FIG. 10 illustrates a flowchart including additional example operations of a process for operation of an improved data storage device in accordance with at least one embodiment of the present disclosure.

DETAILED DESCRIPTION

Embodiments of the present disclosure now will be described more fully hereinafter with reference to the accompanying drawings, in which some, but not all, embodiments of the disclosure are shown. Indeed, embodiments of the disclosure may be embodied in many different forms and should not be construed as limited to the embodiments set forth herein, rather, these embodiments are provided so that this disclosure will satisfy applicable legal requirements. Like numbers refer to like elements throughout.

Overview

Conventional mobile data storage devices (e.g., portable SSDs) suffer from a myriad of deficiencies and technical problems. For example, several conventional portable SSDs only are able to communicate with other external computing devices, such as a user's computer, over a wired connection of a defined type. Such conventional implementations lack efficient usability (e.g., they must be plugged in and in some circumstance subsequently configured), are not operable with a large number of devices (e.g., those that do not have the appropriate port type to connect via the wired connection), and have extraneous components impeding true mobility of the device (e.g., the user must ensure they have the appropriate cable to form the wired connection). Other conventional portable SSDs attempt to solve this problem by utilizing wireless networking capabilities to communicate. Such conventional implementations nevertheless suffer from similar and related problems resulting from the use of such wireless networking capabilities. For example, such conventional implementations are not secure (e.g., enable connection to the portable SSD with relative ease thus making stored files vulnerable to hijack by unauthorized users), cannot be used in circumstances where physical and/or wired connection is preferred (e.g., to further improve data security in high-risk environments), and do not provide sufficient customizability options and/or configuration options to meet user desires (e.g., options for establishing a connection in the desired manner, authorization process options, and/or the like). In this regard, conventional mobile data storage devices remain deficient in many of a myriad of ways.

Embodiments of the present disclosure address each of these deficiencies, provide technical improvements, and improve the overall user experience with utilizing mobile data storage devices. Example embodiments provide a plurality of wireless networking processors, such that the user may select a wireless networking processor that is preferred for particular uses and/or that a corresponding communicable device is configured to utilize. Additionally or alternatively, some example embodiments include one or more data transfer port that similarly enables wired connectivity with a communicable device in a circumstance where such wired communications are desirable. In this regard, example embodiments provide robust functionality and capable of use in a myriad of contexts and with a myriad of different device types, as compared to the limitations of conventional implementations.

Some example embodiments provide appropriate identity and/or user authentication mechanisms driven via hardware, software, firmware, and/or any combination thereof. Example embodiments provide one or more biometric scanner(s) utilized to authenticate a user's identity before granting access, and which may be utilized alone or together with software-driven authentication mechanisms such as a passcode, PIN, and/or other received authentication credentials. In this regard, example embodiments provide improved data security without significantly impeding user access to the data, as compared to the limitations of conventional implementations.

Some example embodiments provide for an improved configuration that enables desirable hardware and/or software interaction and configuration. Example embodiments include a touch-adaptive display that may render any of a myriad of user interfaces for interacting with the other components, performing various functionality, and/or otherwise configuring the components of the embodiment efficiently and in a user-friendly manner without external devices. Example embodiments further maintain various configurations that enable a user to utilize the embodiment in a desired manner and/or cause the embodiment to function in the manner desired in any of a myriad of different aspects. In this regard, example embodiments provide an improved user experience in configuring and/or utilizing functionality related to use of the embodiment and/or data storage, as compared to limitations of conventional implementations.

It should be appreciated that each embodiment of the disclosure may provide any of a myriad of these improvements. In this regard, the mobile data storage devices described herein and/or methods of using the same described herein, for example, improve various aspects of data security, connectivity, robustness, interoperability, and/or usability as compared to conventional implementations. Some or all of these improvements are provided at least partially with respect to utilizing particular hardware implementations and/or configurations as described herein, such that the technical improvements are provided specifically by embodiments including such hardware and/or the specific configurations associated therewith.

Definitions

In some embodiments, some of the operations above may be modified or further amplified. Furthermore, in some embodiments, additional optional operations may be included. Modifications, amplifications, or additions to the operations above may be performed in any order and in any combination.

Many modifications and other embodiments of the disclosure set forth herein will come to mind to one skilled in the art to which this disclosure pertains having the benefit of the teachings presented in the foregoing description and the associated drawings. Therefore, it is to be understood that the embodiments are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

The term "touch-adaptive display" refers to hardware, software, firmware, and/or a combination thereof, that converts user interaction to electronically processable data and that renders one or more user interfaces for viewing by a user of an apparatus. In some embodiments, for example, a touch-adaptive display is embodied by a capacitive touchscreen display that both receives user interaction (e.g., tap(s), gesture(s), multiple simultaneous touch(es), and the like), and renders user interface data.

The term "solid state storage drive" refers to integrated circuitry and/or a corresponding flash memory device that persistently stores data in an electronic format. In some embodiments, a solid state storage drive utilizes non-moving components such that the persistently stored electronic data is maintained in a manner less vulnerable to corruption and/or negative effects due to physical disruption of the device.

The term "wireless networking protocol" refer to one or more frequency ranges and/or standardized encoding and/or transmission methodologies for wirelessly transmitting electronic data. Non-limiting examples of a wireless networking protocol include, without limitation, Bluetooth communication protocol, Wi-Fi communication protocol(s), Near-Field communication ("NFC") protocol, and Radio Frequency communications ("RF") protocol.

The term "wireless networking processor" refers to a processor and/or corresponding supporting signal transceiver(s) for receiving data, sending data, and/or processing received and/or sent data wirelessly to another computing device utilizing a particular wireless networking protocol. Non-limiting examples of a wireless networking processor include, without limitation, a Bluetooth chip and/or corresponding antenna(s), a Wi-Fi chip and/or corresponding antenna(s) an Near-Field Communications chip and/or corresponding antenna(s), and a Radio Frequency chip and/or corresponding antenna(s).

The term "selected wireless networking processor" refers to an electronic value and/or data object representing a particular wireless networking processor selected by a user to be utilized for wirelessly transmitting electronic data to, and/or receiving electronic data from, a communicable device. In some embodiments, a user sets the value of the selected wireless networking processor via software functionality provided by a specially configured device processor.

The term "biometric data" refers to electronically processable data representing one or more of a user's biometric features. Non-limiting examples of biometric data include fingerprint data, retinal data, facial recognition data, and gaiting data.

The term "biometric scanner" refers to hardware, software, firmware, and/or a combination thereof, that converts one or more biometric features of a user into biometric data. Non-limiting examples of a biometric scanner include a fingerprint scanner, a facial recognition camera, a walking gait reader, and a retinal scanner.

The term "device processor" refers to processing circuitry embodied in hardware, software, firmware, and/or a combination thereof that controls one or more components of an apparatus, receives data from one or more components of an apparatus, and/or performs particular functionality associated with or in conjunction with data received from one or more components of an apparatus. Non-limiting examples of a device processor include specially configured integrated circuitry, a microprocessor, a central processing unit, an application specific integrated circuit, and a field programmable gate array. In some embodiments, a device processing includes or is otherwise associated with a memory device that stores computer program instructions executable to initiate the functionality provided by the device processor. In some embodiments, a device processor is embodied by and/or shares processing circuitry with one or more wireless networking processor(s).

The term "communicatively coupling" when utilized in the context of one or more components embodied in hardware, software, firmware, and/or a combination thereof, refers to electronic connectivity via physical circuitry and/or wireless communication mechanisms to enable signal transmission between the one or more components The term "assembled printed circuit board" refers to integrated circuitry, and/or corresponding software and/or firmware, that communicatively couples one or more components, such as a touch-adaptive display, solid state storage drive, wireless networking processor(s), biometric scanner(s), charging port(s), data transfer port(s), light(s), and/or device processor(s), the integrated circuitry. In one example context, components of an apparatus are soldered and/or otherwise electronically affixed to integrated circuitry to embody an assembled printed circuit board.

The term "user" refers to any person, business, or other entity that interacts with an apparatus either directly or through use of an agent.

The term "electronically managed data object" refers to structured and/or encapsulated data embodied in an electronically processable format. Non-limiting examples include computing files, image data, audio data, video data, and/or application data. In some contexts, an electronically managed data object includes or is otherwise associated with metadata for the electronically managed data object, including, for example and without limitation, a file type, a file size, a data object author value, and/or file creation timestamp data and/or file management timestamp data.

The term "content data" refers to a content portion of an electronically managed data object. In some embodiments, content data for a particular electronically managed data object comprises user-generated data, for example and without limitation, text data, image data, video data, audio data, and/or other structured data. In some embodiments, the content data of an electronically managed data object is encrypted utilizing one or more encryption algorithm(s) and/or encryption values.

The term "file decryption value" refers to one or more data values utilized to decrypt encrypted data, such as encrypted content data of an electronic managed data object. In some example contexts, a file decryption value is intended to be kept secret from users not authorized to decrypt and/or otherwise access the content data of the electronically managed data object. Non-limiting examples of a file decryption value include a user-created pin, passcode, password, and/or gesture code.

The term "preview interface" refers to a user interface including at least a portion of content data associated with one or more electronically managed data object. In some embodiments, a preview interface includes one or more rendered representation(s) of a beginning portion of context data such as text data, image data, video data, and/or other data for viewing by a user via an associated display. In one example context where an electronically managed data embodies a document associated with a word processor, for example, the preview interface may display a formatted and/or unformatted representation of the beginning text data of the document.

The term "light indicator array" refers to one or more arranged light generation components (or "light") that are associated with one another. In some embodiments, each individual light is controllable such that the light indicator array is manipulatable to cause the individual lights to activate to desired states, such as to form one or more patterns and/or activation sequences.

The term "communicable device" refers to an external computing device connected via wired and/or wireless mechanisms for communication with a data storage device, such as an improved data storage device as described herein. In some embodiments, a communicable device is connected via a data transfer port of an apparatus, and/or is connected for communication via one or more wireless networking processor(s) of an apparatus.

The term "attempted access" where used with respect to connection to a data storage device refers to a state or request of an external computing device to enable, by the external computing device, reading of electronically managed data object(s) stored via the data storage device and/or transfer of electronically managed data objects to the data storage device and/or transfer of electronically managed data object(s) from the external computing device to the data storage device. In some example contexts, attempted access is determinable based on one or more requests received by a data storage device from an external computing device.

The term "unauthenticated communicable device" refers to a computing device not currently and/or previously authenticated for purposes of accessing a data storage device and/or electronically managed data object(s) stored thereon.

The term "state" where used with respect to a light refers to the activation status of the light (e.g., on or off), a brightness level of the light, and/or a visual property value of the light (e.g., a color value for the light, a currently active activation pattern, and/or the like).

The term "charging port" refers to specially configured hardware configured, and/or combination of hardware with firmware and/or software, that receives an electric charge and apply the electric charge to a battery, a capacitor, and/or other electricity storage unit. In some embodiments, a charging port is configured to receive a physical wire of a specially configured port type to receive the electric charge.

The term "charging level" refers to a percentage and/or absolute value of electric charge stored by a battery, capacitor, and/or other electricity storage unit, and/or a corresponding relative value derived therefrom. In some embodiments, for example, a charging level represents a percentage of a maximum capacitance for a particular battery, capacitor, and/or other electricity storage unit.

The term "data transfer port" refers to specially configured hardware, and/or combination of hardware with firmware and/or software, that receives electronically managed data objects from a communicable device through a wired connection with the communicable device.

The term "data transfer port type" refers to a representation of a hardware configuration for a particular data transfer port. Non-limiting examples of a data transfer port type include, without limitation, a USB-A port, a USC-C port, and a lightning port.

The term "integrated data-charging port" refers to a single electronic component embodied in hardware, firmware, software, and/or a combination thereof, that is configured to function both as a data transfer port and a charging port. In some such contexts, an integrated data-charging port receives a single wired connection that provides both an electric charge and data object(s).

The term "representation" where used with respect to a user interface refers to one or more user interface elements that include a portion of content data for an electronically managed data object, embodying a portion of content data for an electronically managed data object, and/or otherwise are configured to indicate values of a portion of content data for an electronically managed data object.

The term "user interaction" includes any user action detectable and/or received, and processable, by a component of a data storage device. Non-limiting examples of a user interaction include, without limitation, a tap, a touch, a mouse click, a keyboard key press, a virtual key press, a gesture, interaction with a physical button, switch, or other component, an audio command, a movement detected by one or more device sensors, and a user-inputted pattern.

The term "shared orientation" where used with respect to multiple components of a device refer to positioning of such components such that the three-dimensional planes defining the intended orientations of such multiple components when positioned on the device each define parallel normal vectors. For example, with respect to a cuboid shape (or sufficiently cuboid), components oriented on a particular side of the cuboid (e.g., a top face) are each associated with a shared orientation.

Example Systems of the Disclosure

FIG. 1A illustrates a block diagram of a system that may be specially configured within which embodiments of the present disclosure may operate. In this regard, it should be appreciated that in various contexts, embodiments of the present disclosure operate to perform functionality associated with one or more computing devices external to the embodiment. For example, in some example contexts of mobile data storage, an embodiment mobile data storage device interacts with a communicable device external to the embodiment for purposes of receiving, from the communicable device, electronically managed data object(s) for storage and/or transmitting, to the communicable device, electronically managed data object(s) for processing, saving, and/or performing other functionality.

As illustrated, FIG. 1 depicts an example system 100. The example system 100 includes an improved data storage device 102 in communication with an external communicable device 104 over a particular communication network 106. In some embodiments, the communication network 106 comprises or otherwise embodies a wireless communication network that facilitates data transmission between the external communicable device 104 and improved data storage device 102. In this regard, in some such embodiments, the improved data storage device 102 and/or external communicable device 104 each include corresponding hardware, software, firmware, and/or a combination thereof that enables data sending and/or receiving data over the communication network 106, as described herein. It should be appreciated that, in some embodiments, the communication network 106 includes or is embodied by one or more additional devices, intermediary communication devices, and/or the like. For example, in some embodiments, the communication network 106 includes one or more network access points, relays, transmission routing servers, switches, routers, base stations, cellular towers, Internet devices, and/ or the like. In other embodiments, the connection network 106 is facilitated via networking processor(s) of the external communicable device 104 and/or improved data storage device 102, for example in a circumstance where the communication network 106 embodies and/or otherwise comprises a direct wireless connection, near-field communication connection, and/or the like. Non-limiting examples of a communication network 106 include, for example, a Bluetooth communication connection, a near-field communication connection, a Wi-Fi communication connection, and/or the like. It should be appreciated that, in various contexts, the external communicable device 104 and the improved data storage device 102 may be remote from one another. In some such contexts, the external communicable device 104 and improved data storage device 102 may communicate with one another within a particular proximity determined by the communication network 106 utilized (e.g., close-range for near-field communications, mid-range for Bluetooth communications, and long-range for Wi-Fi and/or Internet communications).

The external communicable device 104, in some embodiments, comprises any of a myriad of computing device(s) embodied in hardware, software, firmware, and/or a combination thereof. In some contexts, the external communicable device 104 embodies a user device. For example, in some embodiments the external computing device is embodied by a laptop, desktop, tablet, smartphone, wearable, smart home device, and/or the like. In this regard, such computing device(s) may be accessed by a particular user that interacts with the external communicable device 104 to perform various functionality and/or otherwise utilize the external communicable device 104. In some other contexts, the external communicable device 104 embodies a terminal, server, kiosk, enterprise computing device, and/or the like. In some such embodiments, the external communicable device 104 may not be directly interacted with by a user, for example in a circumstance where the external communicable device 104 functions as a "server" and a user accesses functionality associated with the external communicable device 104 via a "client" device (not depicted) in control of the user. In some embodiments, the external communicable device 104 is embodied by any one or more computing device(s) capable of data manipulation and/or data transmission (either wired or wirelessly) in communication with another device, such as the improved data storage device 102.

The improved data storage device 102 comprises any of a myriad of computing device(s) embodied in hardware, software, firmware, and/or any combination thereof, configured for data storage and/or retrieval as described herein. In some embodiments, the improved data storage device 102 includes at least hardware, software, firmware, and/or a combination thereof, for establishing a connection with the external communicable device 104, receiving transmissions and/or originating transmissions over the communication network 106, selecting a networking processor for use in originating and/or receiving transmissions, and/or electronically managed data object storage and/or maintenance. In this regard, the improved data storage device 102 in some such contexts embodies a portable data storage device (e.g., an improved portable SSD) configured to perform data storage functionality utilizing wired and/or wireless communication mechanisms, as described herein, and in some embodiments additionally providing data access and/or user configuration functionality, as described herein. In some embodiments, additionally or alternatively, in some embodiments, the improved data storage device 102 includes at least hardware, software, firmware, and/or a combination thereof for performing user authentication, as described herein.

FIG. 1B illustrates a block diagram of another system that may be specially configured within which embodiments of the present disclosure may operate. Specifically, as illustrated, FIG. 1B depicts an example system 150. The example system 150 includes the improved storage device 102 in communication with the external communicable device 104 over a particular wired connection 156. The improved data storage device 102 specifically is connected to the wired connection 156 via the data transfer port 152, and the external communicable device 104 is connected to the wired connection 156 via the data transfer port 154. In this regard, it should be appreciated that the external communicable device 104 and improved data storage device 102 otherwise may be embodied in a manner similar to that described with respect to FIG. 1A and the system 100.

In some such embodiments, the improved storage device 102 and the external communicable device 104 are sufficiently proximate such that the two devices may communicate over the wired connection 156. In this regard, it should be appreciated that in some embodiments, the physical proximity between the improved storage device 102 and the external communicable device 104 is limited by one or more components embodying the wired connection 156. In some embodiments, the wired connection 156 is embodied by a single wire connecting the two devices. In other embodiments, the wired connection 156 is embodied by multiple wired connections, daisy-chained connections, adaptors (e.g., to change port type), and/or the like. In this regard, the wired connection 156 enables a direct data transfer (in one direction or in both directions, depending on configuration of the wired connection 156 and each of the external communicable device 104 and improved storage device 102) between the improved storage device 102 and the external communicable device 104. Non-limiting examples of a wired connection 156 include a USB-to-USB connector in of any port type, a lightning connector, a thunderbolt connector, an ethernet connector, a PS/2 connector, and/or the like.

It should be appreciated that, in some such embodiments, each of the external communicable device 104 and the improved data storage device 102 include associated ports for connecting via the wired connection 156, such as the data transfer port 154 associated with the external communicable device 104 and the data transfer port 152 associated with the improved data storage device 102. Each of the data transfer ports 152 and 154 is associated with a particular port type identifying the associated type of connector the data transfer port with which the data transfer port is able to engage and/or otherwise connect with. In some embodiments, the data transfer port 152 is of the same port type as the data transfer port 154. In other embodiments, the data transfer port 152 is of a first port type and the data transfer port 154 is of a second port type different from the first port type.

It should be appreciated that, in some embodiments, the wired connection 156 and/or communications network 106 between the external communicable device 104 and improved data storage device 102 enables transmission of electronic managed data objects to and/or from the improved data storage device 102. For example, in some embodiments, the external communicable device 104 utilizes the communication network 106 and/or wired connection 156 to transmit files, such as images, documents, applications, and/or the like, to the improved data storage device 102 for storing. In some embodiments, the improved data storage device 102 is configured to store the received electronically managed data in one or more data stores, for example a solid state drive and/or other solid state storage drive of the improved data storage device 102. In this regard, the electronically managed data object persists on the improved data storage device, and at a later time is retrievable from the device for subsequent use. For example, in some embodiments, the external communicable device 104 (or another computing device, at a different time for example) additionally or alternatively communicates with the improved data storage device 102 over the communication network 106 and/or wired connection 156 to access electronically managed data objects stored on the improved data storage device 102 and/or retrieve such stored electronically managed data objects from the improved data storage device. In this regard, the improved data storage device 102 may retrieve certain stored electronically managed data objects (e.g., based on a request received from the external communicable device 104 including data identifying the electronically managed data objects to be retrieved), and transmit them over the communication network 106 and/or wired connection 156 to the external communicable device 104. For example, the external communicable device 104 in one example context retrieves stored files from the improved data storage device 102.

It should be appreciated that a first computing device may store an electronically managed data object, and a second computing device retrieves such data. For example, in this regard, the improved data storage device 102 functions as an intermediary for transferring data between the two computing devices. For example, in at least one example context, the external communicable device 104 connects with the improved data storage device 102 over the communication network 106 and/or wired connection 156, communicates with the improved data storage device 102 to store one or more electronically managed data objects, and subsequently disconnects. A second external communicable device (not depicted) subsequently connects with the improved data storage device 102 over the communication network 106 and/or wired connection 156, communicates with the improved data storage device 102 to retrieve the one or more electronically managed data objects and/or store the retrieved data on the second external communicable device, and subsequently disconnects.

In some embodiments, to ensure that each of the communicable devices (such as the external device 104) is authorized to access the improved data storage device 102, the improved data storage device 102 performs one or more authentication processes as described herein before establishing a connection and/or before accepting incoming data and/or transmitting outgoing data. In some embodiments, the improved data storage device 102 is configurable by the user to set one or more properties associated with the authentication process(es) utilized and/or authenticate certain devices, users, and/or the like. For example, in some embodiments, the improved data storage device 102 utilizes one or more authentication processes such as requiring user biometric authentication before accepting a connection and/or enabling a transfer, requiring entering of a user-based or device-based PIN, and/or the like as described herein. Alternatively or additionally, in some embodiments the improved data storage device 102 maintains a whitelist of communicable devices permissioned to access the improved data storage device 102 and/or particular portions thereof (e.g., particular electronically managed data object(s), write access only, read access only, and/or the like).

It should be appreciated that the particular systems are exemplary and other systems may be configured to include additional and/or alternative devices. For example, in some embodiments, the improved data storage device 102 is connected to two external communicable devices at once, forming a three-device system. In yet other embodiments, the improved data storage device 102 is configured to only maintain one connection at once (e.g., one connection whether wired or wireless), or one of each type of connection (e.g., one wired connection and one wireless connection maximum).

Example Computing Environment of the Disclosure

FIG. 2 illustrates a visualization of a computing environment in accordance with at least one embodiment of the present disclosure. Specifically, FIG. 2 depicts an example computing environment 200 that includes various data object(s), value(s), configuration(s), and/or properties maintained by one or more embodiments of the present disclosure. For example, in one or more embodiments, the example computing device 200 is maintained via software executed via corresponding hardware of an improved data storage device 102. For example, in some embodiments the computing environment 200 is maintained by one or more software applications executing via a device processor of the improved data storage device 102, as described herein.

As depicted, the computing environment 200 includes a set of electronically managed data object(s) 202. The set of electronically managed data object(s) 202 can be written to for storing a new electronically managed data object to the set of electronically managed data object(s) 202, and/or read from to retrieve a stored electronically managed data object of the electronically managed data object(s) 202. In some embodiments, the set of electronically managed data object(s) 202 is maintained within one or more databases embodied in hardware, software, firmware, and/or a combination thereof. For example, in some embodiments, the electronically managed data object(s) 202 are arranged a single database manageable via software and persisted via one or more solid state storage drive(s) of an improved data storage device 102. In some other embodiments, the electronically managed data object(s) 202 are arranged into multiple databases manageable via software ad persisted via one or more solid state storage drive(s) of an improved data storage device 102. In one example context, for example, the electronically managed data object(s) are arranged within a first encrypted database (e.g., for storing encrypted electronically managed data objects) and a second non-encrypted database (e.g., for storing unencrypted electronically managed data objects) that are persisted via one or more solid state storage drive(s). It should be appreciated that any number of other known database implementations, embodied in software, hardware, firmware, and/or any combination thereof, may be utilized for arranging the various electronically managed data object(s) 202.

As depicted, the computing environment 200 further includes a selected wireless networking processor 204. In some embodiments, the selected wireless networking processor 204 represents a configuration setting that indicates a particular wireless networking processor of the improved data storage device 102 to be utilized for communication with a communicable device. In some such embodiments, the selected wireless networking processor 204 embodies one or more numerical, categorical, label, or other data values corresponding to the particular wireless networking processor to use. In some such embodiments, the selected wireless networking processor 204 is selectable by a user via functionality provided by the improved data storage device 102. In one example context, for example, the user interacts with the improved data storage device 102 to select a particular wireless networking processor from a set of available wireless networking processors (e.g., selecting from a Wi-Fi wireless networking processor, a Bluetooth wireless networking processor, an NFC wireless networking processor, and/or the like), and in response to the selection the computing environment 200 updates the value represented by the selected wireless networking processor 204 to a discrete value that represents the selected wireless networking processor. For example, in at least one example context, if the user selects the Bluetooth wireless networking processor, the value of the selected wireless networking processor 204 is updated to a value of "Bluetooth," 3 (representing the third option from a defined set of options, the third option corresponding to the Bluetooth wireless networking processor), or any other value corresponding to the Bluetooth wireless networking processor in particular. In some such embodiments, the selected wireless networking processor 204 is retrievable for use when receiving and/or transmitting electronically managed data object(s), for example to initialize the corresponding wireless networking processor for use.

As depicted, the computing environment 200 further includes authenticated user biometric data 206. In some such embodiments, the authenticated user biometric data 206 includes one or more data representations of user biometric(s) (e.g., biometric data) corresponding to one or more users authenticated to access the improved data storage device 102 in any of a myriad of manners. For example, in some embodiments, the In some embodiments, the improved data storage device 102 provides functionality to provision and/or otherwise configure access to some or all of the electronically managed data object(s) stored on the device, and/or related functionality, to only a set of authenticated users. In some such embodiments, the improved data storage device 102 additionally provides functionality to store biometric data associated with such authenticated users via the authenticated user biometric data 206. For example, the user may interact with one or more biometric sensors on the improved data storage device 102 during configuration of an authenticated user to store biometric data associated with the user in the authenticated user biometric data 206. In other embodiments, the authenticated user biometric data 206 is received from an external device during configuration. It should be appreciated that, in some embodiments, the authenticated user biometric data 206 is encrypted and/or otherwise stored in a secure manner to prevent access to the biometric data by unauthorized or otherwise malicious users. In some embodiments, an improved data storage device 102 provides functionality, for example via the example computing environment 200 and/or otherwise, to receive data associated with or representing a particular user biometric during configuration of the improved data storage device, and to store such user biometric data as the authenticated user biometric data 206 for subsequent use. In this regard, the authenticated user biometric data 206 may be retrieved in a circumstance where a user requests access to the improved data storage device 102, such that the authenticated user biometric data 206 may be compared to the received user biometric data to determine whether there is a match and access should be granted.

As depicted, the computing environment 200 further includes one or more device access code(s) 208. In some embodiments, the device access code(s) include one or more data values utilized to authenticate a user identity and/or otherwise authorize a user to access some or all functionality associated with the improved data storage device 102. For example, in some embodiments, the deice access code(s) 208 includes one or more numerical and/or alphanumerical data value(s), gesture data value(s), password value, and/or the like, embodying a passcode utilized to gain access to such functionality of the improved data storage device 102. In one example embodiment, authorization of the device access code(s) 208 is performed upon receiving test access code(s) (e.g., submitted by the user in response to user interaction) to be compared to the device access code(s) 208. In some embodiments, in a circumstance where some or all of the test device access code(s) matches the test access code(s), the improved data storage device 102 authorizes access to functionality associated therewith and/or authorizes use associated with a particular user. It should be appreciated that, in some embodiments, the improved data storage device 102 is intended for access by a plurality of users, each associated with a particular corresponding user data object and/or functionality (e.g., only read permissions, only write permissions, only access to certain electronically managed data objects, full access, and/or the like). In this regard, in some such embodiments, each user data object corresponds to one or more particular device access code(s) 208, such that a user entering test access code(s) that match the device access code(s) 208 is identifiable accordingly and/or may be granted access to the appropriate corresponding functionality.

In some embodiments, an improved data storage device 102 is configurable between multiple states of access. In one example context, for example, the improved data storage device 102 is configurable to a first state not providing access to data management functionality before authorization of the user and/or before authorization to access is granted (e.g., a "locked state"), and a second state providing access to such data management functionality, and/a second state providing access to such data functionality management functionality upon authorization of the user and/or after authorization to access is granted (e.g., an "unlocked state"). For example, in some embodiments, the improved data storage device 102 remains in a locked state until the user successfully authenticates themselves via inputting test access code(s) that are successfully authenticated via the device access code(s0 208. Subsequently, in some embodiments, the improved data storage device 102 remains in an "unlocked state" after authentication until any of a myriad of triggers is met. In one example embodiment, for example, the improved data storage device 102 remains in an "unlocked state" for a determinable time interval (e.g., 1 minute, 2 minutes, 5 minutes, and/or the like). In some embodiments, the improved data storage device 102 remains in an "unlocked state" after authentication until a subsequent indication from the user is received, for example subsequent use of a biometric scanner, engagement with a particular hardware component and/or peripheral, software-driven termination of the access, and/or the like. For example, in some embodiments, upon authentication of the user the improved data storage device 102 provides access to the stored electronically managed data object(s) 202, configuration of the improved data storage device 102, and/or the like. It should be appreciated that in some embodiments, access to such functionality is restricted to particular functionality while in the "unlocked state" based on the authenticated user data object.

As depicted, the computing environment 200 further includes one or more device setting(s) 210. In some embodiments, the device setting(s) 210 include one or more configuration setting(s) and corresponding value(s) for such settings. In some embodiments, the various device setting(s) affect one or more aspects of the operation of the improved data storage device 102. For example, in some embodiments, one or more device setting(s) 210 represents the length of time the improved data storage device 102 remains unlocked upon authentication of a user, authorized uses of electronically managed data object(s) 202, encryption configuration(s) utilized to store one or more electronically managed data object(s) 202 in an encrypted format, read/write permissions for one or more users, and/or the like. Additionally or alternatively, in some embodiments, one or more of the selected wireless networking processor 204, authenticated user biometric data 206, and/or device access code(s) 208 are maintained as one or more of the device setting(s) 210. It should be appreciated that, in some embodiments, a limited number of users are authorized to alter the device setting(s) 210, and/or are only authorized to alter particular device setting(s) of the device setting(s) 210. For example, in some embodiments, one or more administrator users (e.g., corresponding to specially provisioned user data object(s)) is permissioned to alter the device setting(s) 210 while one or more other users is permissioned to access other functionality of the improved data storage device 102.

Example Apparatuses of the Disclosure

Having discussed example systems and computing environments in accordance with the present disclosure, example apparatuses in accordance with the present disclosure will now be described. In some embodiments, the improved data storage device 102 is embodied by one or more computing components embodied in hardware, software, firmware, and/or a combination thereof, such as the apparatus 300 as depicted and described with respect to FIG. 3. The apparatus 300 includes a display protection pane 302, an apparatus front chassis 304, a touch-adaptive display 306, a light indicator array 308, a first integrated data-charging port 310, a storage device insulator 312, a device processor, a Wi-F networking processor, and a Bluetooth networking processor embodied by a combined networking processor 314, a NFC networking processor and RFID networking processor embodied combined NFC communications circuitry 316 and NFC processing circuitry 318, biometric scanner 320, a second integrated data-charging port 322, a solid state storage drive 324, a battery 326, and an apparatus back chassis 328. In some embodiments, one or more of the components depicted and/or described is optional. For example, in some embodiments, the apparatus 300 does not include the indicator light array 308. Additionally or alternatively, in some embodiments, the apparatus 300 only include one integrated data-charging port, and/or separate data transfer port(s) and charging port(s). In yet some other embodiments, the apparatus 300 includes no data transfer ports at all, and only provides for wireless data transfer functionality. In some embodiments, the various components 302-328 are communicatively coupled via one or more printed circuit boards with which the components are engaged, as described herein, to enable transfer of power, data, and/or other electrical signals, between the various components. The apparatus 300 may be configured, using one or more of the components 302-328 to perform the various operations described herein.

Although some components are described herein with respect to functional limitations, it should be understood that the particular implementations necessarily include the use of particular computing hardware. It should also be understood that certain of the components described herein may include similar or common hardware. For example, in some embodiments, two processor(s) (networking processors, device processors, and/or the like) utilize a shared set of processing circuitry for executing one or more instructions, performing data manipulation, and/or the like, utilize a shared set of circuitry for performing user input/output functionality, and/or the like, to perform their associated functions such that duplicate hardware is not required for each component. The use of the term "processor" as used herein should therefore be understood to include particular hardware configured to perform the functions associated with the particular components of the example apparatuses described herein. Particularly, the use of the term "processor" should be understood broadly to include hardware and, in some embodiments, software for configuring the hardware.

The apparatus front chassis 304 and apparatus back chassis 328 each embody portions of an outer shell of the apparatus 300 specifically designed. to encase the various components described with respect to the apparatus 300. In this regard, the apparatus front chassis 304 and the apparatus back chassis 328 form a chassis or "case" that with respect to the other components. In some embodiments, the apparatus front chassis 304 and/or apparatus back chassis 328 include cutouts and/or otherwise lack material in certain places to define particular areas where one or more internal components is/are to be placed, and/or particular ports enabling access from outside the apparatus 300. For example, in some embodiments for example as depicted, the front apparatus chassis 304 and the back apparatus chassis 328 define internal space(s) for positioning one or more components internal to the apparatus 300 (e.g., components 306, 308, 310, 312, 314, 316, 318, 324, and 326). Additionally or alternatively, in some embodiments for example as depicted, the front apparatus chassis 304 and the back apparatus chassis 328 define spaces to receive outward-facing portions of various outward-facing and/or surface level components of the apparatus 300 (e.g., components 302, 322, 316, and 320). It should be appreciated that the apparatus front chassis 304 and the apparatus back chassis 328 may each be formed of any of a myriad of known materials for such housing purposes, including without limitation plastic, metal, tempered glass, and/or the like.

The touch-adaptive display 306 embodies hardware, software, firmware, and/or a combination thereof, embodying a visual display that receives user touch and/or other gesture interaction. In this regard, in some embodiments the touch-adaptive display 306 is configured for rendering any of a number of user interface(s) for viewing by the user of the apparatus 300. For example, in some embodiments, the touch-adaptive display 306 renders one or more interface(s) to enable input of device access code(s) for unlocking the apparatus 300 and/or otherwise enabling access to the solid state storage drive 324. Additionally or alternatively, in some embodiments, the touch-adaptive display 306 renders one or more interface(s) that enable viewing and/or adjustment of configuration settings associated with the apparatus 300. Additionally or alternatively, in some embodiments, the touch-adaptive display 306 renders one or more interface(s) that include representations associated with electronically managed data object(s) stored by the solid state storage drive 324 of the apparatus 300. Additionally or alternatively, in some embodiments, the touch-adaptive display 306 renders one or more preview interface(s) associated with one or more selected electronically managed data object(s). The touch-adaptive display 306 may include and/or otherwise be communicatively coupled with one or more device processors configured to process user interactions with the touch-adaptive display 306, and/or in some embodiments may be communicable with another device processor of the apparatus 300 that configures and/or otherwise causes rendering of one or more interface(s) via the touch-adaptive display 306, for example by the combined networking processor 314.

In some embodiments, the touch-adaptive display 306 is configured for capacitive sensing. For example, in some such embodiments, the user may interact with the touch-adaptive display 306 to access certain functionality associated with the rendered interfaces by tapping, touching, and/or otherwise engaging the touch-adaptive display 306. It should be appreciated that, in some embodiments, the touch-adaptive display 306 is configured to receive a single user touch, multiple user touches simultaneously, user gesture(s), and/or the like. The touch-adaptive display 306 may include and/or otherwise be communicatively coupled with one or more device processors configured to process user interactions with the touch-adaptive display 306, for example by the combined networking processor 314.

The display protection pane 302 embodies one or more solid materials that protects one or more internal components, such as the touch-adaptive display 306, from impacts from external contaminants and/or impact effects (e.g., scratches, dents, burns, and/or the like). In some such embodiments, the display protection pane is engages the apparatus front chassis 304 such that the Additionally or alternatively, in some embodiments, the display protection pane 302 is of a sufficient transparency to enable a user to view the touch-adaptive display 306 through the display protection pane 302. Additionally or alternatively, in some embodiments, the display protection pane 302 is of a suitable material that enables touch input to the touch-adaptive display 306 below it. Non-limiting examples of the display protection pane 302 include glass, tempered glass, chemically enhanced tempered glass, and the like. It should be appreciated that, in some embodiments, the touch-adaptive display 306 and the protection pane 302 are integrated into a single component. In some embodiments, the touch-adaptive display 306 is controlled by a particular device processor, for example the combined networking processor 314 of the apparatus 300.

The light indicator array 308 comprises one or more light generation sources that are under control of the apparatus 300. For example, in one or more embodiments, the light indicator array 308 comprises a set of LEDs, which each may include LEDs of a single color, multiple colors, or the like. In some embodiments, each light generation source of the light indicator array 308 is configurable individually or as a set. In this regard, the light indicator array 308 in some embodiments is controllable for displaying a particular pattern or other visual indication utilizing the various individual light generation sources of the light indicator array 308. In some embodiments, the light indicator array 308 is controlled by a particular device processor, for example the combined networking processor 314 of the apparatus 300.

The light indicator array 308 in some embodiments is activated based on one or more determined configurations based on functionality accessed and/or otherwise being performed via the apparatus 300. In this regard, the different sub-light of the light indicator array 308 are each activated differently to reflect one or more particular indications based on the functionality performed by the apparatus 300. For example, in some embodiments, the light indicator array 308 is activated to reflect a first light pattern when the apparatus 300 is in an unlocked state (e.g., activation of all the lights, and/or activation of all the lights to a first color). In some such embodiments, the light indicator array 308 is deactivated (or alternatively, in some embodiments, activated to an alternative light pattern) to reflect the apparatus 300 is in a locked state. Additionally or alternatively, in some embodiments, the light indicator array 308 is activated to reflect a second light pattern when the apparatus 300 is transferring an electronic data object to a communicable device (e.g., continually activate the lights in a predefined order, activate one or more light(s) to a second color, and/or the like). Additionally or alternatively still, in some embodiments, the light indicator array 308 is activated to reflect a third light pattern when the apparatus 300 is receiving an electronic data object for storage from a communicable device (e.g., continually activate the lights in a predefined order, activate one or more light(s) to a third color, and/or the like). In some embodiments, at determined times, upon user interaction with the touch-adaptive display 306 and/or with the biometric scanner 320, the light indicator array 308 is activated to reflect the current capacitive charge held by the battery 326. For example, in some embodiments such as where the light indicator array 308 includes four sub-lights, each light indicates 25% capacitive charge. Additionally or alternatively, light patterns may be combined with one or more visual effects (e.g., a strobing effect) to indicate second functionality, a second battery state (e.g., critically low battery under a threshold amount), and/or the like.

In some such embodiments, the light indicator array 308 similarly indicates the progress of a particular operation being performed. For example, in some embodiments, the apparatus 300 activates a proportion of lights corresponding to the progress of transmitting an electronically managed data object to a communicable device for storing and/or receiving a new electronically managed data object from a communicable device for storing via the apparatus 300. In this regard, for example in a circumstance where the light indicator array 308 includes four sub-lights, the first light may be activated upon transfer of 25% of the data associated with a particular electronically managed data object, the second light activated upon transfer of 50% of the data, the third light activated at 75%, and the fourth light activated upon transfer of 100% of the data. In this regard, the user is able to determine the status of an operation being performed based on the activation of the light indicator array 308. It should be appreciated that any of a number of light patterns may be utilized to indicate performance of any of a myriad of functions and/or progress of such functions.

The first integrated data-charging port 310 comprises an integrated data-charging port of a first port type. Particularly, as depicted, the first integrated data-charging port 310 embodies a USB-C type port communicable with and/or configured to interact with one or more other components of the apparatus 300. For example, in some embodiments, the integrated data-charging port 310 is connected to and/or otherwise wired to enable charging of the battery 326, for example upon receiving a USB-C type charging cable that engages the apparatus 300 via the integrated data-charging port 310. Additionally or alternatively, in some embodiments, the integrated data-charging port 310 is configured to enable transfer of data to and/or retrieval of data from the solid state storage drive 324. In some such embodiments, the integrated data-charging port 310 enables access to the solid state storage drive 324 upon access to the apparatus 300, as described herein. In this regard, in some circumstances, the integrated data-charging port 310 enables transfer of electronically managed data objects to the solid state storage drive 324 from a USB-C type external storage drive engaged with the integrated data-charging port 310. Alternatively or additionally, in some embodiments, the integrated data-charging port 310 enables transfer of electronically managed data objects from the solid state storage drive 324 to a USB-C type external storage drive engaged with the integrated data-charting port 310. In some embodiments, a single engaged component (e.g., a single USB-C type cable plugged into another external device, such as a personal computer) provides both charging of one or more components of the apparatus 300, such as the battery 326, and data transfer of electronically manage data objects between the solid state storage drive 324 and the external device via the integrated data-charging port 310.

The apparatus 300 further includes the second integrated data-charging port 322. As depicted, the second integrated data-charging port 322 embodies a second port type, specifically a USB-A type port communicable with and/or configured to interact with one or more other components of the apparatus 300. In some embodiments, the second integrated data-charging port 322 is configured to perform the same and/or similar functionality as described with respect to the first integrated data-charging port 310. For example, in this regard, in some embodiments the second integrated data-charging port 322, when engaged with an external component and/or device, enables charging of the battery 326 and/or access to the solid state storage drive 324. In some embodiments, the second integrated data-charging port 322 provides only data transfer functionality associated with the solid state storage drive 324, while the first integrated data-charging port 310 provides both charging and data transfer functionality. It should be appreciated that by providing multiple port types, the apparatus 300 provides for improved usability and interoperability with an increased number of computing devices.

The storage device insulator 312 embodies one or more material layers that is positioned on top of and/or below the solid state storage drive 326 and that assists in environment regulation of one or more components of the apparatus 300. In some embodiments, the storage device insulator 312 provides temperature regulation intended to keep the solid state storage drive 324 within a desired operable temperature range. For example, in some embodiments, the storage device insulator 312 dissipates heat generated by the solid state storage drive 326 and/or one or more components that abut the solid state storage device 326, for example the touch-adaptive display 306. Additionally or alternatively, in some embodiments, the storage device insulator 312 provides protection from environment contaminants that could affect the solid state storage drive 326. It should be appreciated that the storage device insulator 312 may be made of any of a myriad of known materials, including foam insulation, thermal padding, and/or the like.

The combined networking processor 314 embodies processing and/or storage circuitry, as well as communications circuitry, that embodies a Wi-Fi networking processor and Bluetooth networking processor in addition to a device processor. In this regard, as a Wi-Fi networking processor, the combined networking processor 314 is embodied in hardware, software, firmware, and/or a combination thereof, that provides for establishing and/or maintaining a Wi-Fi network connection, receiving and/or transmitting data over a Wi-Fi connection, and/or processing received data (e.g., for storing via the solid state storage drive 326). Additionally or alternatively, as a Bluetooth networking processor, the combined networking processor 314 is embodied in hardware, software, firmware, and/or a combination thereof, that provides for establishing and/or maintaining a Bluetooth network connection, receiving and/or transmitting data over a Bluetooth network connection, and/or processing received data (e.g., for storing via the solid state storage drive 326). Additionally or alternatively still, as a device processor, the combined networking processor 314 is embodied in hardware, software, firmware, and/or a combination thereof, that controls activation of various components of the apparatus 300 and/or corresponding processing functionality. For example, in some embodiments, the combined networking processor 314 is configured to provide functionality that maintains the computing environment 200, and/or provides functionality associated therewith, for example for authenticating access to the apparatus 300, selecting a wireless networking processor for use, configuring authenticated user data (biometrics, access codes, and/or the like), and/or otherwise altering device settings associated with the apparatus 300. Additionally or alternatively, in some embodiments, the combined networking processor 314 is configured to provide functionality associated with controlling and/or otherwise interacting with one or more other components of the apparatus 300. For example, in some embodiments, the combined networking processor 314 provides access to data access functionality associated with storing electronically managed data object(s) via the solid state storage drive 326, controlling activation of the light indicator array 308, activating biometric reading functionality via the biometric scanner 320, and/or controlling rendering of user interface(s) to the touch-adaptive display 306.

In some embodiments, the combined networking processor 314 is embodied at least in part utilizing any of a myriad of processing circuitry and/or memory circuitry implementations. For example, in some embodiments, the combined networking processor 314 is embodied utilizing one or more specially configured microprocessor(s), central processing unit(s) and/or non-transitory memory, application specific integrated circuit(s), field programmable gate array(s), and/or the like. In some embodiments, the combined networking processor 314 includes discrete communications circuitry (e.g., antenna(s), transceiver(s), and/or the like) enabling signal propagation and/or reception together with discrete processing circuitry for each type of communications circuitry and/or shared processing circuitry. For example, in some embodiments, the combined networking processor 314 comprises a microprocessor in communication with one or more transceivers specially configured to transmit and/or receive signals over a particular type of communication network. A non-limiting example of a combined networking processor 314 includes a specially configured ESP32 microcontroller provided by Espressif Systems Co., LTD of Shanghai, China.

As described, in some embodiments, the apparatus 300 comprises a NFC networking processor and/or a RFID networking processor embodied by the combined NFC communications circuitry 316 and the NFC processing circuitry 318. In some embodiments, the combined NFC communications circuitry 316 embodies one or more antenna(s), transceiver(s) and/or other signal propagation and/or reception hardware, software, firmware, and/or a combination thereof that enables transmission and/or reception of NFC and/or other RFID signals. In some embodiments, for example, the combined NFC communications circuitry 316 is embodied by one or more high gain NFC antenna(s) configured to output signals of a defined frequency and/or receive signals of a defined frequency.

Similarly, in some embodiments, the NFC processing circuitry 318 is embodied by hardware, software, firmware, and/or a combination thereof, that initiates transmission of one or more signals via the combined NFC communications circuitry 316, and/or processing of received signals from the combined NFC communications circuitry 316. For example, in some embodiments, the NFC processing circuitry 318 is embodied by a second microcontroller, processor and/or memory, specially configured application specific integrated circuit, and/or field programmable gate array. Additionally or alternatively, in some embodiments, the NFC processing circuitry is embodied by a NFC/RFID module that integrates with a device processor, for example embodied by the combined networking processor 314.

The biometric scanner 320 is embodied by hardware, software, firmware, and/or a combination thereof that reads user biometric data in response to interaction by a particular user. For example, in some embodiments, the biometric scanner 320 embodies a fingerprint scanner that, when engaged by a user, reads user biometric data representing a user's fingerprint. For example, in some circumstances, a user interacts with the biometric scanner 320 to provide user biometric data representing the user's fingerprint, and if the provided user biometric data matches stored user biometric data representing fingerprint data for authenticated user(s), access to the apparatus 300 is granted and/or changes between an unlocked state and locked state (e.g., unlocks in a circumstance where the apparatus 300 was previously locked when the user biometric data was read, or locks in a circumstance where the apparatus 300 was previously unlocked when the user biometric data was read). It should be appreciated, as described herein, that in some embodiments the biometric scanner 320 is activated by and/or otherwise controlled by a device processor, for example embodied by the combined networking processor 314, and/or the user biometric data read via the biometric scanner 320 is provided to and/or processed by the device processor to identify and/or perform an appropriate action based on the read user biometric data and/or stored user biometric data. It should be appreciated that in some embodiments, the biometric scanner 320 is configured for reading any other type of user biometric as described herein.

The solid state storage drive 324 is embodied by hardware, software, firmware, and/or a combination thereof that persistently stores data. In this regard, in some such embodiments, the solid state storage drive 324 is embodied utilizing integrated circuitry, flash memory, and/or the like to store data in a persistent manner without requiring the use of moving components conventionally utilized in other hard drive or memory storing implementations. The solid state storage drive 324 in some embodiments enables data storage and retrieval of the persistently stored data. For example, a user may interact with the solid state storage drive 324, via the combined networking processor 314 embodying a device processor for example, to access electronically managed data objects stored on the solid state storage drive 324 for retrieval and/or to store new electronically managed data objects to the solid state storage drive 324. It should be appreciated that, in some embodiments, the solid state storage drive 324 is embodied in any of a myriad of known solid state drive configurations embodied in hardware, software, and/or firmware.

The battery 326 is embodied by specially configured hardware configured to carry an electrical charge, provide power to one or more of the components of the apparatus 300, and enable recharging via one or more of the mechanisms described herein. For example, in some embodiments the battery 326 is embodied by a lithium-ion polymer battery that utilizes one or more electroconductive polymer(s) to store the electric charge. In some such embodiments, the battery 326 receives an electric charge from an external component engaged with the apparatus 300 through a charging port, such as one of the integrated data-charging ports 310 and/or 322, and stores the charge for future use in powering any of the components of the apparatus 300. In some such embodiments, one or more components of the apparatus 300 are each connected to the battery 326 to enable powering of such components by the battery 326. It should be appreciated that, in other embodiments, alternative battery implementations known in the art are utilized to power the various components of the apparatus 300.

FIG. 4 illustrates an example collapsed internal view of an assembled example improved data storage device in accordance with at least one embodiment of the present disclosure. Specifically, FIG. 4 depicts various components of the apparatus 300 assembled to form the assembly 400. In this regard, the assembly 400 includes the various components 310, 314, 316, and 326 positioned within the apparatus chassis embodied by the apparatus front chassis 304 and apparatus back chassis 328 in a manner that enables a reduced form factor. For example, in some embodiments, the apparatus 300 is embodied in a total size of 170 mm in length (approximately 6.69 inches), 79.5 mm in width (approximately 3.13 inches), and 18 mm in depth (approximately 0.71 inches). It should be appreciated that in this regard, the component size of the various components embodying apparatus 300 serve as a limiting factor of the apparatus size. In other words, as the various components of the apparatus 300 are designed with reduced sizes, the apparatus 300 similarly may be reduced in size accordingly.

FIGS. 5A, 5B, and 5C each illustrate various views of the example apparatus 300 as assembled to embody the assembled apparatus 500. Specifically, FIG. 5A illustrates a front view of an example improved data storage device, for example embodied by the assembled apparatus 500, in accordance with at least one embodiment of the present disclosure. Specifically, FIG. 5B illustrates a perspective view of the front of an example improved data storage device, for example embodied by the assembled apparatus 500, in accordance with at least one embodiment of the present disclosure. Specifically, FIG. 5C illustrates a perspective view of the back of an example improved data storage device, for example embodied by the assembled apparatus 500, in accordance with at least one embodiment of the present disclosure.

As depicted in FIGS. 5A, 5B, and 5C, the assembled apparatus 500 includes an assembled apparatus chassis 506, a visible portion of an indicator light array 504, a visible portion of a touch-adaptive display 502, and an interactive portion of a biometric scanner 512. Additionally, as depicted in FIGS. 5A, 5B, and 5C, the assembled apparatus includes an accessible portion of a first integrated data-charging port 508 and an accessible portion of a second integrated data-charging port 510. Each of these components include visible portions of a corresponding component as described with respect to the apparatus 300.

For example, the assembled apparatus chassis 506 positions each of the components in a particular location. In this regard, as depicted, the assembled apparatus chassis 506 positions the visible portion of the indicator light array 504 to be in the top right corner of the front of the apparatus 500 and positions the visible portion of the touch-adaptive display 502 on the center-left of the front of the apparatus 500. In this regard, the visible portion of the touch-adaptive display 502 and the visible portion of the indicator light array 504 are each visible and/or interactable from the same side of the apparatus 500. In this manner, the user may perform various functionality via the visible portion of the touch-adaptive display 502 and observe changes to the visible portion of the indicator light array 504. For example, as the user performs various functionality through interacting with the touch-adaptive display 502 and/or otherwise, the indicator light array 504 is updated to reflect particular light activation(s) and/or pattern(s) that correspond to the functionality performed via the apparatus. In this regard, the user may monitor changes indicated via the indicator light array 504, for example to ensure the indications by the indicator light array 504 correspond only to the actions the user initiated (e.g., to ensure the apparatus has not been accessed by any unauthorized and/or otherwise malicious external computing devices). The back of the assembled apparatus chassis 506, in some embodiments, includes one or more hatches and/or removable components that provide access to the internal compartment of the apparatus, and/or access to particular components of the apparatus. For example, in some embodiments, the removable components provide access to the battery 326 for purposes of battery replacement and/or other management. In other embodiments, one or more other components are accessible via the back of the assembled apparatus chassis 506.

The assembled apparatus chassis 506 includes a cutout that fits the accessible portion of the first integrated data-charging port 508 and a second cutout that fits the accessible portion of the second integrated data-charging port 510, which are located on opposite transverse ends of the assembled apparatus 500. In this regard, each of the accessible portions of the first and second integrated data-charging port 508 and 510 can be engaged simultaneously without blocking one another and/or negatively impacting use of the visible portion of the touch-adaptive display 502. For example, a user of the apparatus 500 may engage a first cord and/or external device via the accessible portion of the first integrated data-charging port 508 and engage a second a second cord and/or external device via the accessible portion of the second integrated data-charging port 510, with neither of the computing devices and/or cords blocking one another and similarly not blocking access to the visible portion of the touch-adaptive display 502.

The assembled apparatus chassis 506 further includes a cutout that fits the interactive portion of the biometric scanner 512. In this regard, the user may interact with the biometric scanner via the interactive portion of the biometric scanner 512 from the outside of the apparatus 500. For example, the biometric scanner in some embodiments is positioned such that the interactive portion of the biometric scanner 512 is positioned along a top edge of the assembled apparatus 500. By positioning the biometric scanner such that the interactive portion of the biometric scanner 512 is along a top (or in other embodiments, a bottom) edge of the assembled apparatus 500, the user may easily interact with the biometric scanner while holding the assembled apparatus 500. For example, the biometric scanner 512 in some embodiments is positioned such that a user can readily interact with the biometric scanner with their thumb while holding the assembled apparatus 500.

Example Processes of the Disclosure

Having described example systems, computing environments, and apparatuses in accordance with the present disclosure, example processes in accordance with the present disclosure will now be described. For ease of illustration and description, several processes and sub-processes are depicted as flowcharts including various operations that embody the process. It should be appreciated that each of the flowcharts depicts an example computer-implemented process that may be performed by one or more of the apparatuses, systems, and/or devices described herein, for example an improved data storage device 102 embodied by the apparatus 300 as described herein. The blocks indicating operations of each process may be arranged in any of a number of ways, as depicted and described herein. In some such embodiments, one or more blocks of any of the processes described herein occur in-between one or more blocks of another process, before one or more blocks of another process, and/or otherwise operates as a sun-process of a second process. Additionally or alternative, any of the processes may include some or all of the steps described and/or depicted, including one or more optional operational blocks in some embodiments. With regard to the flowcharts illustrated herein, one or more of the depicted blocks may be optional in some, or all, embodiments of the disclosure. Optional blocks are depicted with broken (or "dashed") lines. Similarly, it should be appreciated that one or more of the operations of each flowchart may be combinable, replaceable, and/or otherwise altered as described herein.

FIG. 6 illustrates a flowchart including example operations of an example process for operation of an improved data storage device in accordance with at least one embodiment of the present disclosure. Specifically, FIG. 6 depicts an example process 600 for improved data management utilizing an improved data storage device. In some embodiments, the process 600 is embodied by computer program code stored by one or more non-transitory computer-readable mediums of a computer program product configured for execution to perform the computer-implemented process described herein. Alternatively or alternatively, in some embodiments, the process 600 is performed by one or more specially configured devices, such as the apparatus 300 embodying an improved data storage device 102 alone or in communication with an external communicable device. In some such embodiments, the apparatus 300 is configured by computer program instructions stored thereon, for example in a memory of and/or otherwise accessible to a device processor. For purposes of description, the processes are described as executed with respect to a particular apparatus 300.

The process 600 begins at optional operation 602. At optional operation 602, the apparatus 300 includes means, such as the touch-adaptive display 306, the first integrated data-charging port 310, the combined networking processor 314 (or corresponding separate device and/or networking processor(s)), the NFC communications circuitry 316 and the NFC processing circuitry 318 (or corresponding separate networking processor(s)), the biometric scanner 320, the second integrated data-charging port 322, the solid state storage drive 324, the battery 326, and/or the like, to establish a connection with at least one communicable device. For example, in some embodiments, the apparatus 300 establishes a connection with at least one communicable upon being via one or more networking processor(s) of the apparatus 300. In this regard, the apparatus 300 may maintain a connection with the communicable device to enable transmission between the devices via one or more associated wireless networking protocols. In this regard, in some embodiments, the apparatus 300 receives, from the at least one communicable device, one or more specially configured transmissions utilized to establish the connection with the communicable device, and/or the apparatus 300 transmits, to the communicable device, one or more specially configured transmission(s) utilized to establish the connection with the communicable device. In some such embodiments, the specially configured transmissions includes identifying information and/or networking information associated with the apparatus 300 and/or at least one communicable device. Additionally or alternatively, in some embodiments, the apparatus 300 establishes a connection with the at least one communicable device via a wired connection, for example through engagement with the at least one communicable device via the integrated data-charging ports 310 and/or 322.

It should be appreciated that, in some embodiments, only a single connection is maintained with a particular communicable device, for example associated with a particular selected networking processor, to prevent interaction with multiple devices at once. Alternatively, in some other embodiments, a set number of connections associated with a corresponding set number of at least communicable devices is maintained, with each connection maintained independently such that the user may interact with each of the communicable device(s) for purposes of performing various data transfer functionality. In some embodiments, the apparatus 300 is previously connected with at least one communicable device before operation of the process 600.

At operation 604, the apparatus 300 includes means, such as the touch-adaptive display 306, the first integrated data-charging port 310, the combined networking processor 314 (or corresponding separate device and/or networking processor(s)), the NFC communications circuitry 316 and the NFC processing circuitry 318 (or corresponding separate networking processor(s)), the biometric scanner 320, the second integrated data-charging port 322, the solid state storage drive 324, the battery 326, and/or the like, to authenticate a user is permitted to access a solid state storage drive. In some embodiments, the apparatus 300 authenticates a user based on maintained device access code(s) that indicate access to the solid state storage drive by an authenticated user. For example, in some embodiments, the apparatus 300 receives user-inputted device access code(s) and compares the user-inputted device access code(s) with stored authenticated user access code(s) to determine whether the access code(s) match. In some such circumstances where one or more of the access code(s) match, the apparatus 300 authenticates the user is permitted access to the solid state storage device. Additionally or alternatively, in some embodiments, the apparatus 300 authenticates a user is permitted to access a solid state storage drive based on maintained authenticated user biometric data that indicate access to the solid state storage drive by an authenticated user associated with the biometric data. For example, the authenticated user biometric data may be maintained upon configuration of the apparatus 300 for enabling access. In this regard, the apparatus 300 in some embodiment receives user-inputted biometric data and compares the user-inputted user biometric data with the maintained authenticated user biometric data. In some such circumstances where the biometric data matches (or otherwise satisfies a sufficient match threshold, for example 80% match), the apparatus 300 authenticates the user is permitted access to the solid state storage device.

In some embodiments, in response to authenticating the user is permitted to access a solid state storage drive, the apparatus 300 grants access to various functionality associated with accessing the solid state storage drive. For example, in some embodiments, upon authenticating the user is permitted to access a solid state storage drive, the apparatus 300 initiates and/or otherwise enters an "unlocked" state enabling functionality to access the solid state storage drive. In some such embodiments, when in the unlocked state, various functionality associated with storing electronically managed data objects to the solid state storage drive and/or retrieving electronically managed data objects from the solid state storage drive is accessible via the apparatus 300. In some such embodiments, in a circumstance where the apparatus 300 remains in (e.g., authentication of the user is unsuccessful) and/or returns to a "locked" state after authentication of the user, such functionality for accessing the solid state storage drive via the apparatus 300 becomes inaccessible. For example, in some such embodiments, when in the "locked" state, the apparatus provides access to functionality only for entering information utilized to attempt to authenticate a user for accessing the solid state storage drive (e.g., device access code(s), user biometric data, and/or the like), and/or configuring one or more device settings associated with the apparatus 300.

At operation 606, the apparatus 300 includes means, such as the touch-adaptive display 306, the first integrated data-charging port 310, the combined networking processor 314 (or corresponding separate device and/or networking processor(s)), the NFC communications circuitry 316 and the NFC processing circuitry 318 (or corresponding separate networking processor(s)), the biometric scanner 320, the second integrated data-charging port 322, the solid state storage drive 324, the battery 326, and/or the like, to identify a set of electronically managed data objects stored via the solid state storage drive. In this regard, the set of electronically managed data objects is maintained by the solid state storage drive in response to previous storage transactions between the apparatus 300 and the communicable device and/or other communicable devices. In this regard, the electronically managed data objects may embody stored information, files, and/or the like, from any of a myriad of computing devices. It should be appreciated that the set of electronically managed data objects may be identified in any of a myriad of manners. For example, in some embodiments the solid state storage drive is queried for stored electronically managed data objects stored therein to identify such electronically managed data object(s). In some embodiments, the apparatus 300 identifies all electronically managed data objects stored via the solid state storage drive. In some other embodiments, the apparatus 300 identifies a set of electronically managed data objects identifies a set of electronically managed data objects embodying a subset of the electronically managed data objects stored via the solid state storage drive. For example, in some embodiments, the apparatus 30 identifies a particular threshold number of electronically managed data objects based on one or more user-selected properties (e.g., recently stored, recently accessed, alphabetical, in order of date stored, and/or the like). In some embodiments, the apparatus 300 provides access to functionality associated with managing and/or otherwise interacting with one or more of the electronically managed data objects of the identified set of electronically managed data objects, for example to access and/or otherwise view one or more electronically managed data object(s) via the apparatus 300, update access to the one or more electronically managed data objects, transfer one or more of such electronically managed data object(s) to a communicable device associated with the apparatus 300, and/or the like, as described herein.

In some embodiments, the electronically managed data objects are identified specifically based on a user data object authenticated at operation 606. For example, in some embodiments, the apparatus 300 identifies a user data object corresponding to the authenticated user based on user-submitted information, such as user-submitted device access codes and/or user-submitted user biometric data. In some such embodiments, the user data object is associated with and/or otherwise permissioned to access particular electronically managed data objects stored via the solid state storage drive, and the apparatus 300 identifies at least a portion of such electronically managed data object for use.

At operation 608, the apparatus 300 includes means, such as the touch-adaptive display 306, the first integrated data-charging port 310, the combined networking processor 314 (or corresponding separate device and/or networking processor(s)), the NFC communications circuitry 316 and the NFC processing circuitry 318 (or corresponding separate networking processor(s)), the biometric scanner 320, the second integrated data-charging port 322, the solid state storage drive 324, the battery 326, and/or the like, to receive, via user input data, a new selected wireless networking processor of the plurality of wireless networking processors. In some such embodiments, for example, a user interacts with the apparatus 300 to provide the user input data representing a new selected wireless networking processor for use in performing various communications with currently connected and/or future connected communicable device(s). In some embodiments, the apparatus 300 updates the maintained selected wireless networking processor to reflect the new selected wireless networking processor. In this regard, upon updating the selected wireless networking processor to reflect the new selected wireless networking processor, subsequent communications with a communicable device may be performed via the wireless networking processor corresponding to the value represented by the new selected wireless networking processor. For example, in one example context, the user inputs a new selected wireless networking processor representing a NFC networking processor of the apparatus 300, such that subsequent connections with a communicable device and/or communications with a communicable device are performed via a NFC networking processor of the apparatus 300. It should be appreciated that, in some embodiments, the apparatus 300 provides a specially configured mechanism selection interface, such as via the touch-adaptive display of the apparatus 300, that enables the user to provide the user input data representing the new selected wireless networking processor.

In some embodiments, the apparatus 300 is configured to perform any of a number of functions associated with transfer of electronically managed data objects to and/or from the solid state storage drive to and/or from a communicable device. In this regard, in some embodiments for example, the flow proceeds to operation 610. In other embodiments, the flow proceeds to operation 614. In some embodiments, the apparatus 300 is configured to perform any number of iterations of each of the subprocesses described with respect to operations 610-612 and 614, and/or the other processes described herein, to enable storage of any number of new electronically managed data objects and/or transfer of any number of stored electronically managed data object(s) to one or more communicable devices.

At operation 610, the apparatus 300 includes means, such as the touch-adaptive display 306, the first integrated data-charging port 310, the combined networking processor 314 (or corresponding separate device and/or networking processor(s)), the NFC communications circuitry 316 and the NFC processing circuitry 318 (or corresponding separate networking processor(s)), the biometric scanner 320, the second integrated data-charging port 322, the solid state storage drive 324, the battery 326, and/or the like, to receive, via at least one of a plurality of wireless networking processors, at least one new electronically managed data object for storing via the solid state storage drive. In some embodiments, for example, the apparatus 300 receives the new electronically managed data object via a wireless networking processor represented by a current value of a selected wireless networking processor. In this regard, the new electronically managed data object may represent data received from a communicable device, for example with which a connection was established at an earlier operation (e.g., operation 602). For example, the apparatus 300 in some such embodiments receives signals from the communicable device utilizing the selected wireless networking processor and processes the received signals embodying the at least one new electronically managed data object(s). In some such embodiments, each of the various wireless networking processors may receive and/or process data utilizing different protocols, standards, frequencies, and/or the like. The new electronically managed data object may represent a file, document, and/or other data that was maintained by the communicable device and for which a transfer was initiated to the apparatus 300 for storing via the solid state storage device. In some embodiments, the new electronically managed data object is received for storage in response to user interaction with the communicable device to initiate the transfer of the new electronically managed data object to the apparatus 300 for storing. It should be appreciated that the apparatus 300 may receive any number of new electronically managed data object(s) for storing via the solid state storage drive. For example, in some embodiments, the new electronically managed data object is received as part of a set of electronically managed data objects for storing via the solid state storage drive.

At operation 612, the apparatus 300 includes means, such as the touch-adaptive display 306, the first integrated data-charging port 310, the combined networking processor 314 (or corresponding separate device and/or networking processor(s)), the NFC communications circuitry 316 and the NFC processing circuitry 318 (or corresponding separate networking processor(s)), the biometric scanner 320, the second integrated data-charging port 322, the solid state storage drive 324, the battery 326, and/or the like, to store, via the solid state storage drive, the at least one new electronically managed data objects. In some embodiments, for example, the apparatus 300 provides one or more instructions to the solid state storage drive for storing the at least one new electronically managed data objects. The new electronically managed data object(s) may be stored by the solid state storage drive in open memory space not currently allocated to any other stored electronically managed data object(s) maintained by the solid state storage drive. Upon storing the new electronically managed data objects via the solid state storage drive, the apparatus 300 may subsequently retrieve such data object(s) at a future time.

In some embodiments, the at least one new electronically managed data objects are stored with user-determined and/or otherwise determinable (e.g., device-determined) encryption. For example, in some embodiments, the apparatus 300 stores the at least one new electronically managed data objects in an encrypted format based on a user selection to encrypt such new electronically managed data object(s). In some such embodiments, the apparatus 300 encrypts the at least one new electronically managed data objects utilizing one or more file encryption values that correspond to one or more file decryption values to be utilized to decrypt the electronically managed data object at a later time. In some such embodiments, the file encryption and/or decryption values may be user-provided, predetermined by the apparatus 300, and/or the like.

In some embodiments, the at least one new electronically managed data object(s) is stored associated with a particular user data object associated with the authenticated user. For example, in some such contexts, the apparatus 300 stores the electronically managed data object(s) in a manner such that they are retrievable in subsequent instances where stored electronically managed data objects are to be identified associated with a particular user.

Alternatively or additionally, at operation 614, the apparatus 300 includes means, such as the touch-adaptive display 306, the first integrated data-charging port 310, the combined networking processor 314 (or corresponding separate device and/or networking processor(s)), the NFC communications circuitry 316 and the NFC processing circuitry 318 (or corresponding separate networking processor(s)), the biometric scanner 320, the second integrated data-charging port 322, the solid state storage drive 324, the battery 326, and/or the like, to transfer at least one of the set of electronically managed data objects to a communicable device via at least one of a plurality of wireless networking processors. For example, in some embodiments, the apparatus 300 originates signals to a selected wireless networking processor that instruct the selected wireless networking processor to begin emitting signals for transferring the at least one of the set of electronically managed data objects. In this regard, in some embodiments, the apparatus 300 transfers the at least one electronically managed data objects of the set of electronically managed data objects over an earlier-established connection with the communicable device, for example established at operation 602. In some such embodiments, the specific signals emitted by a particular wireless networking processor utilized to transfer the at least one of the set of electronically managed data objects are specially configured based on the particular wireless networking processor utilized to perform the transfer. In one example context, for example, the transfer is performed via a NFC wireless networking processor that generates NFC signals in accordance with one or more particular NFC standards, protocols and/or the like, as opposed to a Bluetooth wireless networking processor that generates Bluetooth signals in accordance with one or more particular Bluetooth standards, protocols, and/or the like. Alternatively or additionally, in some embodiments, the apparatus 300 initiates transfer of the at least one of the set of electronically managed data objects via a data transfer port. Upon completion of the transfer, the communicable device may process and/or store the at least one set of electronically managed data objects. For example, in one example context, the transfer of the at least one set of electronically managed data objects to the communicable device enables at least one electronically managed data object to be moved from the apparatus 300 to the communicable device and/or copied from the apparatus 300 to a memory system of the communicable device.

FIG. 7 illustrates a flowchart including additional example operations of a process for operation of an improved data storage device in accordance with at least one embodiment of the present disclosure. Specifically, FIG. 7 depicts an example process 700 for indicating access of a solid state storage drive using a light indicator array. In some embodiments, the process 700 is embodied by computer program code stored by one or more non-transitory computer-readable mediums of a computer program product configured for execution to perform the computer-implemented process described herein. Alternatively or alternatively, in some embodiments, the process 700 is performed by one or more specially configured devices, such as the apparatus 300 embodying an improved data storage device 102 alone or in communication with an external communicable device. In some such embodiments, the apparatus 300 is configured by computer program instructions stored thereon, for example in a memory of and/or otherwise accessible to a device processor. For purposes of description, the processes are described as executed with respect to a particular apparatus 300.

The process 700 begins at optional operation 702. In some embodiments, the process 700 begins after one or more operations of another process, such as after performance of the operation 602 of the process 600 as depicted and described. Additionally or alternatively, in some embodiments, upon completion of the process 700 flow proceeds to one or more operations of another process, such as the operation 604 of the process 600 as depicted and described. In other embodiments, the flow ends upon completion of the process 700.

At operation 702, the apparatus 300 includes means, such as the touch-adaptive display 306, the first integrated data-charging port 310, the combined networking processor 314 (or corresponding separate device and/or networking processor(s)), the NFC communications circuitry 316 and the NFC processing circuitry 318 (or corresponding separate networking processor(s)), the biometric scanner 320, the second integrated data-charging port 322, the solid state storage drive 324, the battery 326, and/or the like, to detect attempted access of a solid state storage drive by an unauthenticated communicable device. For example, in some embodiments, the attempted access is detected while the apparatus 300 is in a locked state, or alternatively and/or additionally, is received from a device that is not associated with data of a whitelist of devices having access to the solid state storage drive. In this regard, the unauthenticated communicable device may attempt to establish a connection with the apparatus 300 for accessing the solid state storage drive, and/or provides one or more transmissions to the apparatus 300 requesting access to the solid state storage drive and/or electronically managed data objects stored thereon. It should be appreciated that the attempted access of the solid state storage drive may be received over any of a myriad of wireless networking processor(s). In some embodiments, for example, a transmission attempting or otherwise requesting access of the solid state storage drive is received over a selected wireless networking processor configured for use in communication with external communicable devices. Alternatively or additionally, in yet some embodiments, the apparatus 300 detects attempted access of the solid state storage drive in response to receiving of requests to retrieve electronically managed data object(s) and/or store electronically managed data object(s) via the solid state storage drive via a wireless networking processor not currently selected for use.

At operation 704, the apparatus 300 includes means, such as the touch-adaptive display 306, the first integrated data-charging port 310, the combined networking processor 314 (or corresponding separate device and/or networking processor(s)), the NFC communications circuitry 316 and the NFC processing circuitry 318 (or corresponding separate networking processor(s)), the biometric scanner 320, the second integrated data-charging port 322, the solid state storage drive 324, the battery 326, and/or the like, to set a light indicator array to a first state. In some such embodiments, the first state indicates the attempted access of the solid state storage drive by an unauthenticated communicable device. For example, in some embodiments, the apparatus 300 sets the light indicator array, and/or specific sub-lights thereof, to a particular color. Additionally or alternatively, in some embodiments, the apparatus 300 sets the light indicator array, and/or specific sub-lights thereof, to a state for performing a particular pattern (e.g., a strobe, activating sub-lights in a particular order, and/or the like). It should be appreciated that in some embodiments, the first state is determined based on a pre-configuration of the apparatus 300 (e.g., to set the light indicator array to a particular state) and/or a configuration of the apparatus 300 by the user.

In some embodiments, the apparatus 300 further controls the light indicator array based on subsequent interactions with the unauthenticated communicable device. In this regard, flow may proceed to one or both of operations 706 and/or 710.

At operation 706, the apparatus 300 includes means, such as the touch-adaptive display 306, the first integrated data-charging port 310, the combined networking processor 314 (or corresponding separate device and/or networking processor(s)), the NFC communications circuitry 316 and the NFC processing circuitry 318 (or corresponding separate networking processor(s)), the biometric scanner 320, the second integrated data-charging port 322, the solid state storage drive 324, the battery 326, and/or the like, to authenticate the unauthenticated communicable device. In some embodiments, the apparatus 300 authenticates the unauthenticated communicable device by authenticating the user associated with the unauthenticated user device in any of a myriad of manners, for example as described herein with respect to operation 604 of the process 600. In some such embodiments, for example, the apparatus 300 authenticates the unauthenticated communicable device using device access codes provided via the apparatus 300 (e.g., input via a touch-adaptive display of the apparatus 300) and/or the unauthenticated communicable device (e.g., input via the unauthenticated communicable device and transmitted to the apparatus 300 for authentication). Additionally or alternatively, in some embodiments, the apparatus 300 authenticates the unauthenticated communicable device using user-inputted user biometric data. Additionally or alternatively, in some other embodiments, the apparatus 300 authenticates the unauthenticated communicable device based on device identification information associated with the unauthenticated communicable device. For example, in some embodiments, the user updates a whitelist of authenticated devices to include device identification data associated with the unauthenticated communicable device.

At operation 708, the apparatus 300 includes means, such as the touch-adaptive display 306, the first integrated data-charging port 310, the combined networking processor 314 (or corresponding separate device and/or networking processor(s)), the NFC communications circuitry 316 and the NFC processing circuitry 318 (or corresponding separate networking processor(s)), the biometric scanner 320, the second integrated data-charging port 322, the solid state storage drive 324, the battery 326, and/or the like, to, in response to authenticating the unauthenticated communicable device, set the light indicator array to a second state. In some embodiments, the second state comprises a default state. In some such embodiments, for example, the second state is an off or otherwise deactivated state, such that light indicator array ceases indicating that the solid state storage drive is being accessed by an unauthenticated communicable device. In other embodiments, the second state comprises a second activated state (e.g., a different color light, light pattern utilizing the light indicator array and/or sub-components thereof, and/or the like) that indicates the unauthenticated communicable device is continuing to access the solid state storage drive, but has been authenticated successfully. In this regard, the user viewing the light indicator array may perceive the change from the first state to the second state that indicates the attempted access by an unauthenticated communicable device has ceased. In one particular context, for example the light indicator array is set to a first red state before authentication of the unauthenticated communicable device, and a second blue state in response to successfully authenticating the unauthenticated communicable device.

Alternatively or additionally, at operation 710, the apparatus 300 includes means, such as the touch-adaptive display 306, the first integrated data-charging port 310, the combined networking processor 314 (or corresponding separate device and/or networking processor(s)), the NFC communications circuitry 316 and the NFC processing circuitry 318 (or corresponding separate networking processor(s)), the biometric scanner 320, the second integrated data-charging port 322, the solid state storage drive 324, the battery 326, and/or the like, to detect termination of the attempted access of the solid state storage drive by the unauthenticated communicable device. In some embodiments, for example, the apparatus 300 detects such a termination in response to a threshold length of time passing without further communication by the unauthenticated communicable device. Alternatively or additionally, in some embodiments, the apparatus 300 detects termination of the attempted access of the solid state storage drive in response to termination of a connection between the unauthenticated communicable device and the apparatus 300 (e.g., utilizing a wireless networking processor). Alternatively or additionally still, in some embodiments, the apparatus 300 detects termination of the attempted access of the solid state storage drive in response to a subsequent specially configured transmission from the authenticated communicable device indicating termination of such attempted access.

At operation 712, the apparatus 300 includes means, such as the touch-adaptive display 306, the first integrated data-charging port 310, the combined networking processor 314 (or corresponding separate device and/or networking processor(s)), the NFC communications circuitry 316 and the NFC processing circuitry 318 (or corresponding separate networking processor(s)), the biometric scanner 320, the second integrated data-charging port 322, the solid state storage drive 324, the battery 326, and/or the like, to, in response to detecting the termination of the attempted access of the solid state storage drive by the unauthenticated communicable device, set the light indicator array to a second state. In some embodiments, for example, the second state is an off or otherwise deactivated state, such that the light indicator array ceases indicating that the unauthenticated communicable device is attempting access to the solid state storage drive. Alternatively or additionally, in other embodiments, the second state comprises a second activate state as described. It should be appreciated that, in some other embodiments, the second state indicating the termination of the attempted access is different from the second state upon authentication of the unauthenticated communicable device. For example, in some embodiments, the light indicator array is set to a second color in a circumstance where the unauthenticated communicable device is successfully authenticated, and deactivated in a circumstance where the apparatus 300 detects termination of the attempted access of the solid state drive by the unauthenticated communicable device.

In some such embodiments, the setting of the light indicator array enables the user to perceive attempted access to the solid state storage device. In circumstances where the user has not initiated such actions or otherwise determines the attempted access is by a malicious or otherwise unauthenticated user, the user of the apparatus 300 may deny such access and/or otherwise perform any of a number of functions to prevent such unauthorized access. In this regard, the light indicator array enables the user to readily detect performed actions to ensure they meet user expectations.

FIG. 8 illustrates a flowchart including additional example operations of a process for operation of an improved data storage device in accordance with at least one embodiment of the present disclosure. Specifically, FIG. 8 depicts an example process 800 for authenticating a user via biometric data associated with the user. In some embodiments, the process 800 is embodied by computer program code stored by one or more non-transitory computer-readable mediums of a computer program product configured for execution to perform the computer-implemented process described herein. Alternatively or alternatively, in some embodiments, the process 800 is performed by one or more specially configured devices, such as the apparatus 300 embodying an improved data storage device 102 alone or in communication with an external communicable device. In some such embodiments, the apparatus 300 is configured by computer program instructions stored thereon, for example in a memory of and/or otherwise accessible to a device processor. For purposes of description, the processes are described as executed with respect to a particular apparatus 300.

The process 800 begins at operation 802. In some embodiments, the process 800 begins after one or more operations of another process, such as after performance of the operation 602 of the process 600 as depicted and described. Additionally or alternatively, in some embodiments, upon completion of the process 800 flow proceeds to one or more operations of another process, such as the operation 604 of the process 600 as depicted and described. In other embodiments, the flow ends upon completion of the process 800.

At operation 802, the apparatus 300 includes means, such as the touch-adaptive display 306, the first integrated data-charging port 310, the combined networking processor 314 (or corresponding separate device and/or networking processor(s)), the NFC communications circuitry 316 and the NFC processing circuitry 318 (or corresponding separate networking processor(s)), the biometric scanner 320, the second integrated data-charging port 322, the solid state storage drive 324, the battery 326, and/or the like, to receive biometric data associated with a user. In some embodiments, the biometric data is received in response to user interaction with at least one biometric scanner of the apparatus 300. For example, in some embodiments, the user engages the at least one biometric scanner of the apparatus 300 with a corresponding part of the user's body to enable the biometric scanner to read data corresponding to particular features of the user's body. In one particular context, for example, the at least one biometric scanner comprises a fingerprint scanner that reads fingerprint data in response to a user interacting with the fingerprint scanner (e.g., by running the user's finger over the surface of the apparatus 300). In other embodiments, the biometric data received comprises eye data provided in response to user interaction with an eye scanner, walking gait data in response to user interaction with a gait scanner and/or specially configured camera module, and/or the like. It should be appreciated that, in some embodiments, the apparatus 300 includes multiple types of biometric scanners and/or requires user interaction with multiple interactions with multiple types of biometric scanners as part of authenticating the user. Additionally or alternatively, in some embodiments, the apparatus 300 includes multiple biometric scanners of the same type (e.g., multiple fingerprint scanners) disposed at different positions on the apparatus 300, for example to improve the usability of such biometric scanner(s). In some such embodiments, the apparatus 300 may receive the biometric data from one of such biometric scanner(s), and/or from any of a number of such biometric scanner(s).

At operation 804, the apparatus 300 includes means, such as the touch-adaptive display 306, the first integrated data-charging port 310, the combined networking processor 314 (or corresponding separate device and/or networking processor(s)), the NFC communications circuitry 316 and the NFC processing circuitry 318 (or corresponding separate networking processor(s)), the biometric scanner 320, the second integrated data-charging port 322, the solid state storage drive 324, the battery 326, and/or the like, to authenticate the user based at least in part on the biometric data. For example, in some embodiments, the apparatus 300 identifies and/or otherwise retrieves authenticated biometric data stored and/or otherwise maintained by the apparatus 300 for comparing to the received biometric data from the user. In this regard, in some such embodiments, the apparatus 300 compares the received biometric data and the stored authenticated biometric data to determine whether such data sufficiently matches (e.g., above a particular minimum similarity threshold) for purposes of indicating with sufficient certainty that the user is the authenticated user associated with the authenticated biometric data. It should be appreciated that, in some embodiments, a single match of biometric data is determined sufficient to authenticate the user, whereas in other embodiments the user is successfully authenticated only after matching multiple received biometric data to corresponding stored authenticated biometric data.

FIG. 9 illustrates a flowchart including additional example operations of a process for operation of an improved data storage device in accordance with at least one embodiment of the present disclosure. Specifically, FIG. 9 depicts an example process 900 for previewing at least one electronically managed data object. In some embodiments, the process 900 is embodied by computer program code stored by one or more non-transitory computer-readable mediums of a computer program product configured for execution to perform the computer-implemented process described herein. Alternatively or alternatively, in some embodiments, the process 900 is performed by one or more specially configured devices, such as the apparatus 300 embodying an improved data storage device 102 alone or in communication with an external communicable device. In some such embodiments, the apparatus 300 is configured by computer program instructions stored thereon, for example in a memory of and/or otherwise accessible to a device processor. For purposes of description, the processes are described as executed with respect to a particular apparatus 300.

The process 900 begins at operation 902. In some embodiments, the process 900 begins after one or more operations of another process, such as after performance of the operation 602 of the process 600 as depicted and described. Additionally or alternatively, in some embodiments, upon completion of the process 900 flow proceeds to one or more operations of another process, such as the operation 604 of the process 600 as depicted and described. In other embodiments, the flow ends upon completion of the process 900.

At operation 902, the apparatus 300 includes means, such as the touch-adaptive display 306, the first integrated data-charging port 310, the combined networking processor 314 (or corresponding separate device and/or networking processor(s)), the NFC communications circuitry 316 and the NFC processing circuitry 318 (or corresponding separate networking processor(s)), the biometric scanner 320, the second integrated data-charging port 322, the solid state storage drive 324, the battery 326, and/or the like, to cause rendering, via a touch-adaptive display, of one or more representations associated with at least a portion of the set of electronically managed data objects. In some embodiments, for example, the representations embody one or more properties of each of the set of electronically managed data object(s). For example, in some embodiments, the representations include a file name associated with the electronically managed data object, a file type, a file size, a file storage date, an encryption status, and/or the like. In some embodiments, each of these properties is rendered associated with a representation in a single user interface element associated with a particular electronically managed data object of the set of electronically managed data objects. In some such embodiment, the user interface element associated with a particular electronically managed data object is configured to receive user interaction, for example to access the electronically managed data object and/or provide a preview of the electronically managed data object as described herein.

At operation 904, the apparatus 300 includes means, such as the touch-adaptive display 306, the first integrated data-charging port 310, the combined networking processor 314 (or corresponding separate device and/or networking processor(s)), the NFC communications circuitry 316 and the NFC processing circuitry 318 (or corresponding separate networking processor(s)), the biometric scanner 320, the second integrated data-charging port 322, the solid state storage drive 324, the battery 326, and/or the like, to receive, via the touch-adaptive display, a user interaction associated with a first electronically managed data object of the set of electronically managed data objects. For example, in some embodiments, the user interacts with a particular representation rendered via the touch-adaptive display that is associated with the first electronically managed data object. In some such embodiments, for example, the user interaction comprises a user tap on the touch-adaptive display at a location where the representation of the first electronically managed data object is rendered. In this regard, the user interaction indicates the user would like to access and/or otherwise preview the content and/or other information associated with the first electronically managed data object.

In some embodiments, an electronically managed data object requires decryption before information and/or content associated with the electronically managed data object can be accessed and/or displayed. In this regard, at optional operation 906, the apparatus 300 includes means, such as the touch-adaptive display 306, the first integrated data-charging port 310, the combined networking processor 314 (or corresponding separate device and/or networking processor(s)), the NFC communications circuitry 316 and the NFC processing circuitry 318 (or corresponding separate networking processor(s)), the biometric scanner 320, the second integrated data-charging port 322, the solid state storage drive 324, the battery 326, and/or the like, to receive a file decryption value associated with at least the first electronically managed data object. In some embodiments, for example, the file decryption value is inputted by a user, for example via interaction with the touch-adaptive display. The file decryption value in some embodiments represents a passcode, password, and/or other data value that is usable to decrypt the electronically managed data object. In yet other embodiments, the apparatus 300 identifies the file decryption value utilized to decrypt the first electronically managed data object (e.g., automatically, by retrieving a stored file decryption value for use associated with the electronically managed data object, and/or the like). In some embodiments, each electronically managed data object is decrypted utilizing different file decryption value(s). In other embodiments, all electronically managed data objects are decrypted utilizing the same file decryption value.

At optional operation 908, the apparatus 300 includes means, such as the touch-adaptive display 306, the first integrated data-charging port 310, the combined networking processor 314 (or corresponding separate device and/or networking processor(s)), the NFC communications circuitry 316 and the NFC processing circuitry 318 (or corresponding separate networking processor(s)), the biometric scanner 320, the second integrated data-charging port 322, the solid state storage drive 324, the battery 326, and/or the like, to decrypt the first electronically managed data object to identify content data of the first electronically managed data object. When encrypted, the first electronically managed data object (and/or a specific portion thereof, such as a content portion) may be inaccessible and/or otherwise not readable in either a human-readable format, machine-readable format, and/or both, such that decryption is required to enable such readability. In some embodiments, for example, the apparatus 300 utilizes one or more determined decryption algorithms to decrypt the first electronically managed data object utilizing the file decryption value. It should be appreciated that any of a myriad of decryption algorithms may be utilized to decrypt the first electronically managed data object, including one-way decryption and/or two-way decryption, private key decryption, and/or the like. In some such embodiments, the content of the first electronically managed data object comprises a specific portion of the electronically managed data object. For example, in some embodiments, each electronically managed data object includes at least a content portion and a metadata portion.

At operation 910, the apparatus 300 includes means, such as the touch-adaptive display 306, the first integrated data-charging port 310, the combined networking processor 314 (or corresponding separate device and/or networking processor(s)), the NFC communications circuitry 316 and the NFC processing circuitry 318 (or corresponding separate networking processor(s)), the biometric scanner 320, the second integrated data-charging port 322, the solid state storage drive 324, the battery 326, and/or the like, to cause rendering, via the touch-adaptive display, of a preview interface associated with content data of the first electronically managed data object. In some embodiments, for example, the preview interface includes one or more representations of the content data, such that the user of the apparatus 300 may view the content data and/or otherwise interact with the content data. For example, in some embodiments where the content data comprises text data, the preview interface includes a formatted and/or structured representation of the text data in a manner readable by the user of the apparatus 300. In some such embodiments, the apparatus 300 enables user interaction with the preview interface to enable, for example, scrolling to view additional text data and/or a different portion of the text data, and/or the like. In another embodiment where the content data comprises image data, the preview interface includes a rendered representation of the image data in a manner visible by the user.

Additionally or alternatively, in some embodiments, the preview interface includes one or more rendered interface elements and/or representations associated with accessing functionality for performing functionality associated with the first electronically managed data object. In some embodiments, for example, the preview interface is rendered including or otherwise associated with one or more interface element(s) for editing one or more properties (e.g., metadata properties such as file name, type, and/or the like) associated with the first electronically managed data object. Additionally or alternatively, in some embodiments, the preview interface is rendered including and/or associated with one or more interface element(s) for deleting the first electronically managed data object from being stored via the solid state storage drive. Additionally or alternatively still, in some embodiments, the preview interface is rendered including and/or associated with one or more interface element(s) for initiating transfer of the first electronically managed data object to one or more communicable device(s), for example utilizing any of the wireless networking processor(s) and/or data transfer ports of the apparatus 300. In this regard, in some such embodiments, the user may interact with any of the interface elements to initiate the corresponding functionality, for example.

FIG. 10 illustrates a flowchart including additional example operations of a process for operation of an improved data storage device in accordance with at least one embodiment of the present disclosure. Specifically, FIG. 10 depicts an example process 1000 for indicating accessed functionality using a light indicator array in accordance with at least some example embodiments of the present disclosure. In some embodiments, the process 1000 is embodied by computer program code stored by one or more non-transitory computer-readable mediums of a computer program product configured for execution to perform the computer-implemented process described herein. Alternatively or alternatively, in some embodiments, the process 1000 is performed by one or more specially configured devices, such as the apparatus 300 embodying an improved data storage device 102 alone or in communication with an external communicable device. In some such embodiments, the apparatus 300 is configured by computer program instructions stored thereon, for example in a memory of and/or otherwise accessible to a device processor. For purposes of description, the processes are described as executed with respect to a particular apparatus 300.

The process 1000 begins, in some embodiments, at operation 1002, and/or in some embodiments at operation 1004. It should be appreciated that, in some embodiments, both of the operations 1002 and/or 1004 are performed by a particular embodiment. In some embodiments, the process 1000 begins after one or more operations of another process, such as after performance of the operation 612 of the process 600 as depicted and described. Additionally or alternatively, in some embodiments, upon completion of the process 1000 flow proceeds to one or more operations of another process, such as the operation 614 of the process 600 as depicted and described. In other embodiments, the flow ends upon completion of the process 1000.

At operation 1002, the apparatus 300 includes means, such as the touch-adaptive display 306, the first integrated data-charging port 310, the combined networking processor 314 (or corresponding separate device and/or networking processor(s)), the NFC communications circuitry 316 and the NFC processing circuitry 318 (or corresponding separate networking processor(s)), the biometric scanner 320, the second integrated data-charging port 322, the solid state storage drive 324, the battery 326, and/or the like, to activate a light indicator array based on a charging level associated with a battery of the apparatus 300. In this regard, the light indicator array may be configured to indicate the current charging level associated with the battery in a particular determinable visual manner. For example, in some embodiments, the light indicator array is set to a particular state associated with a particular color, brightness, and/or other visual effect that is based on the charging level associated with the battery. In this regard, the state of the light indicator array may change as the charging level associated with the battery, for example to different colors, brightness levels, and/or the like as the battery charging level decreases and/or otherwise changes above or below certain determinable thresholds (e.g., every 10%, 20%, 25%, and/or the like). In other embodiments, the light indicator array includes a plurality of sub-lights, and the apparatus 300 activates a particular pattern of the sub-lights based on the charging level associated with the battery. For example, in some embodiments, each sub-light represents a particular percentage charging level of a maximum charging level based on the total number of sub-lights. For example, in a circumstance where the light indicator array includes four sub-lights, each sub-light may be activated to indicate the charging level is above an additional 25% of the maximum charging level (e.g., 1 light below 25%, 2 lights between 26% and below 50%, 3 lights between 51% and below 75%, and four lights between 76% and 100%). It should be appreciated that the light indicator array may be otherwise configured to indicate the current charging level associated with the battery in any of a myriad of manners.

In some embodiments, the apparatus 300 activates the light indicator array based on the charging level associated with the battery at predetermined times. For example, the light indicator array may be activated every hour. In other embodiments, the apparatus 300 activates the light indicator array in response to particular user interaction and/or user input via the apparatus 300. For example, in some embodiments, the user interacting with a biometric scanner in a particular manner activates the light indicator array based on the charging level associated with the battery. In other embodiments, for example, the apparatus 300 activates the light indicator array based on the charging level associated with the battery upon changing of the apparatus 300 to an "unlocked" state and/or "locked" state.

By activating the light indicator array based on the charging level associated with the battery, the use may quickly determine the charging level associated with the battery without significant user interface requirements and/or excess functionality. In some embodiments, for example, the light indicator array is activated without activating the touch-adaptive display of the apparatus 300, reducing the power required to provide this indication to the user and minimizing the effect of the brightness of the apparatus 300 on the user's environment. Additionally or alternatively, in some embodiments where the light indicator array is similarly utilized for any of a myriad of other indications provided herein, the various indications may be provided without additional hardware components that would increase cost, require additional component space, and otherwise negatively impact the portability of the apparatus 300.

Alternatively or additionally, at operation 1004, the apparatus 300 includes means, such as the touch-adaptive display 306, the first integrated data-charging port 310, the combined networking processor 314 (or corresponding separate device and/or networking processor(s)), the NFC communications circuitry 316 and the NFC processing circuitry 318 (or corresponding separate networking processor(s)), the biometric scanner 320, the second integrated data-charging port 322, the solid state storage drive 324, the battery 326, and/or the like, to set the light indicator array to a first state upon initiating of the transfer of the at least one of the set of electronically managed data objects. In this regard, for example, the first state is associated specifically with transfer, from a communicable device, of an electronically managed data object to the apparatus 300 for storing and/or from the apparatus 300 to a communicable device. In some such embodiments, for example, the light indicator array is set by activating the light indicator array to a particular color, pattern, brightness, and/or other visual property. In this regard, the user of the apparatus 300 may perceive the light indicator array set to the first state to confirm the apparatus 300 is transferring the electronically managed data object.

In some embodiments, the state of the light indicator array is updated as the transfer of at least one electronically managed data object continues. For example, in some embodiments, the apparatus 300 sets the light indicator array to a first state embodying a repeating pattern until the transfer of the at least one electronically managed data object is complete (e.g., activation of a first us-light, then a second sub-light, and so on before deactivating all lights and starting again 0. In other embodiments, for example, the apparatus 300 sets the light indicator array to various states that reflect the status of the transfer action. In one example embodiment, for example, the apparatus 300 activates sub-lights of the light indicator array one at a time to indicate the percentage of data with respect to the total percentage of data that has been successfully transferred. In a circumstance where the light indicator array includes four sub-lights, the apparatus 200 may set the light indicator array to an updated state activating an additional sub-light after successful transfer of every 25% of the total data to be transferred. In other embodiments, another visual property, such as color and/or brightness, is additionally or alternatively utilized to further indicate the amount of data successfully transferred with respect to the total amount to be transferred (e.g., 100% represented by all of the at least one electronically managed data objects to be transferred).

At operation 1006, the apparatus 300 includes means, such as the touch-adaptive display 306, the first integrated data-charging port 310, the combined networking processor 314 (or corresponding separate device and/or networking processor(s)), the NFC communications circuitry 316 and the NFC processing circuitry 318 (or corresponding separate networking processor(s)), the biometric scanner 320, the second integrated data-charging port 322, the solid state storage drive 324, the battery 326, and/or the like, to set the light indicator array to a second state upon completion of the transfer of the at least one of the set of electronically managed data objects. In some embodiments, for example, the second state deactivates the light indicator array and/or specific sub-lights thereof, indicating completion of the transfer. In other embodiments, the second state activates the light indicator array and/or particular sub-lights based on one or more different visual properties from the first state. For example, in some embodiments, the apparatus 300 sets the light indicator array to a second state to activate the light indicator array and/or one or more sub-lights thereof to a particular color, brightness, and/or pattern indicating completion of the data transfer. It should be appreciated that in some embodiments, the second state is determinable by the apparatus 300, and/or in other embodiments the user may interact with the apparatus 300 to configure the visual effects associated with the first and/or second states.

In some such embodiments, the light indicator array provides an improved mechanism for indicating the status of a transfer action to the user. Such an indication may be provided in a minimally invasive way without requiring additional rendering via the touch-adaptive display and in a manner that utilizes reduced power as compared to rendering such indication(s) via the touch-adaptive display. Further, in some embodiments, the updating state of the light indicator array provides enables the user to quickly assess the status of a transfer action without additional interaction and/or activation of the touch-adaptive display and/or other components of the apparatus 300.

CONCLUSION

Although an example processing system has been described above, implementations of the subject matter and the functional operations described herein can be implemented in other types of digital electronic circuitry, or in computer software, firmware, or hardware, including the structures disclosed in this specification and their structural equivalents, or in combinations of one or more of them.

Embodiments of the subject matter and the operations described herein can be implemented in digital electronic circuitry, or in computer software, firmware, or hardware, including the structures disclosed in this specification and their structural equivalents, or in combinations of one or more of them. Embodiments of the subject matter described herein can be implemented as one or more computer programs, i.e., one or more modules of computer program instructions, encoded on computer storage medium for execution by, or to control the operation of, information/data processing apparatus. Alternatively, or in addition, the program instructions can be encoded on an artificially-generated propagated signal, e.g., a machine-generated electrical, optical, or electromagnetic signal, which is generated to encode information/data for transmission to suitable receiver apparatus for execution by an information/data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices), and in some embodiments are configured to interact with specific apparatuses, devices, and/or the like configured to perform the operations described herein.

The operations described herein can be implemented as operations performed by an information/data processing apparatus on information/data stored on one or more computer-readable storage devices or received from other sources.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or information/data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described herein can be performed by one or more programmable processors executing one or more computer programs to perform actions by operating on input information/data and generating output. Processors suitable for the execution of a computer program include, by way of example, both general and special purpose microprocessors, and any one or more processors of any kind of digital computer. Generally, a processor will receive instructions and information/data from a read-only memory or a random access memory or both. The essential elements of a computer are a processor for performing actions in accordance with instructions and one or more memory devices for storing instructions and data. Generally, a computer will also include, or be operatively coupled to receive information/data from or transfer information/data to, or both, one or more mass storage devices for storing data, e.g., magnetic, magneto-optical disks, or optical disks. However, a computer need not have such devices. Devices suitable for storing computer program instructions and information/data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

While this specification contains many specific implementation details, these should not be construed as limitations on the scope of any disclosures or of what may be claimed, but rather as descriptions of features specific to particular embodiments of particular disclosures. Certain features that are described herein in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. An apparatus comprising:
   a touch-adaptive display configured to receive user input and render data;
   a solid state storage drive configured to store a plurality of discrete files received from at least one other device;
   a plurality of wireless networking processors associated with a plurality of wireless networking protocols;
   at least one biometric scanner;
   at least one device processor; and
   an assembled printed circuit board communicatively coupling each of the touch-adaptive display, the solid state storage drive, the plurality of wireless networking processors, the biometric scanner, and the at least one device processor,
   wherein the device processor is configured to perform functionality consisting of:
      authenticate that a user is permitted to access the solid state storage drive;
      identify the plurality of discrete files stored via the solid state storage drive;
      cause rendering, via the touch-adaptive display, of a representation of each file of the plurality of discrete files stored via the solid state storage drive,
   transfer at least one of the plurality of discrete files to a communicable device via at least one of the plurality of networking processors;
      delete one or more of the plurality of discrete files;
      receive, from the communicable device or a second communicable device, one or more new discrete files for storage; and
      store, via the solid state storage drive, the one or more new discrete files.

2. The apparatus of claim 1, the apparatus further comprising:
   at least one charging port coupled with a battery configured to provide power to the apparatus; and
   at least one data transfer port,
   wherein the charging port and at least a first data transfer port of the at least one data transfer port are embodied by an integrated data-charging port.

3. The apparatus of claim 2, wherein the at least one data transfer port comprises the integrated data-charging port of a first data transfer port type and a second data transfer port of a second data transfer port type.

4. The apparatus of claim 1, wherein the device processor is configured to transfer the at least one of the plurality of discrete files by performing:

determine, based at least in part on user interaction detected onboard the apparatus, a selected wireless networking processor of the plurality of wireless networking processors, and wherein the device processor is configured to transfer the at least one of the plurality of discrete files to the communicable device via the selected wireless networking processor of the plurality of wireless networking processors.

5. The apparatus of claim 1, wherein the device processor is configured to authenticate that the user is permitted to access the solid state storage drive by performing:

receive biometric data associated with the user in response to user interaction with the at least one biometric scanner, wherein to authenticate the user is permitted to access the solid state storage drive, the device processor is configured to authenticate the user associated with biometric data is permitted to access the solid state storage drive.

6. The apparatus of claim 1, wherein the device processor is figured to transfer the at least one of the plurality of discrete files in response to user interaction associated with at least one of the representations associated with the plurality of discrete files rendered via the touch-adaptive display.

7. The apparatus of claim 1, wherein the at least one biometric scanner comprises a fingerprint scanner disposed perpendicular to the touch-adaptive display.

8. The apparatus of claim 7, wherein the at least one biometric scanner comprises a second fingerprint scanner disposed with a shared orientation as the touch-adaptive display.

9. The apparatus of claim 1, further comprising:
a light indicator array communicatively coupled with the assembled printed circuit board.

10. The apparatus of claim 1, wherein the device processor is configured to receive the one or more new discrete files by performing:

determine, based on user interaction detected onboard the apparatus, a selected wireless networking processor of the plurality of wireless networking processors, and wherein the device processor is configured to receive the one or more new discrete files from the communicable device via the selected wireless networking processor of the plurality of wireless networking processors.

11. A computer-implemented method consisting of:

authenticating, by a device processor communicatively coupled via an assembled printed circuit board with a touch-adaptive display, a solid state storage drive, a plurality of wireless networking processors, a biometric scanner, and a data transfer port, wherein a user is permitted to access the solid state storage drive;

identifying, by the device processor, a plurality of discrete files stored via the solid state storage drive;

causing rendering, via the touch-adaptive display, of a representation of each file of the plurality of discrete files stored via the solid state storage drive;

transferring, by the device processor, at least one of the plurality of discrete files to a communicable device via at least one of the plurality of networking processors;

deleting one or more of the plurality of discrete files;

receiving, from the communicable device or a second communicable device, one or more new discrete files for storage; and storing, via the solid state storage drive, the one or more new discrete files.

\* \* \* \* \*

UNITED STATES PATENT AND TRADEMARK OFFICE
CERTIFICATE OF CORRECTION

PATENT NO.         : 11,928,196 B2
APPLICATION NO.    : 17/021750
DATED              : March 12, 2024
INVENTOR(S)        : Tawaun Bell Page 1 of 1

It is certified that error appears in the above-identified patent and that said Letters Patent is hereby corrected as shown below:

In the Claims

<u>Column 45,</u>
Line 24, Claim 6 "figured" should read --configured--.

Signed and Sealed this
Tenth Day of December, 2024

Katherine Kelly Vidal
*Director of the United States Patent and Trademark Office*